United States Patent
Bissonette et al.

(10) Patent No.: US 10,713,712 B2
(45) Date of Patent: Jul. 14, 2020

(54) SYSTEM INTEGRATING CREDIT CARD TRANSACTIONS INTO A FINANCIAL MANAGEMENT SYSTEM

(75) Inventors: Richard Bissonette, Springfield, VA (US); Christopher Royal Corrie, Fairfax, VA (US); William Lee Wingate, III, Fairfax, VA (US)

(73) Assignee: CGI TECHNOLOGIES AND SOLUTIONS INC., Fairfax, VA (US)

( * ) Notice: Subject to any disclaimer, the term of this patent is extended or adjusted under 35 U.S.C. 154(b) by 4191 days.

(21) Appl. No.: 09/922,106

(22) Filed: Aug. 6, 2001

(65) Prior Publication Data

US 2001/0051917 A1    Dec. 13, 2001

Related U.S. Application Data

(63) Continuation of application No. 09/140,795, filed on Aug. 26, 1998, now Pat. No. 6,343,279.

(51) Int. Cl.
*G06Q 40/02* (2012.01)
*G06Q 20/40* (2012.01)
(Continued)

(52) U.S. Cl.
CPC ............. *G06Q 40/02* (2013.01); *G06Q 20/10* (2013.01); *G06Q 20/102* (2013.01);
(Continued)

(58) Field of Classification Search
CPC combination set(s) only.
See application file for complete search history.

(56) References Cited

U.S. PATENT DOCUMENTS 3,576,539 A * 4/1971 Huber ................ G06Q 20/4037
235/380
3,727,186 A * 4/1973 Stephenson, Jr. ...........................
G06Q 20/4037
340/5.4

(Continued)

OTHER PUBLICATIONS

American Management Systems, "An Introduction to Momentum Financials", Apr. 1997.

(Continued)

*Primary Examiner* — Asha Puttaiah
(74) *Attorney, Agent, or Firm* — Staas & Halsey LLP

(57) ABSTRACT

A system integrates credit card transactions into a financial management system used by a company to track and control budgets, etc. The system provides the controls and accounting for credit card transactions found for other types of transactions within the financial management system. The invention limits the card transactions using various limits not available to a credit card issuer and ensures that the transactions comply the financial system controls. The transactions can be obligated prior to or during the actual transaction with the bank and thereby subjected to the controls of the financial management system. Obligated transactions can be authorized for immediate payment. The invention provides for the complete reconciliation of the credit card transactions with bank records after the transactions occur using the obligation function to capture the transaction before it occurs, even the transactions that are immediately paid. The system reconciles the transactions recorded by the bank with those recorded in the financial system and updates budget, plan, project, and ledger entries accordingly. The system also allows cardholders to identify disputes and track the correspondence with the card issuer over the dispute.

2 Claims, 23 Drawing Sheets

(51) Int. Cl.
*G06Q 40/00* (2012.01)
*G06Q 20/10* (2012.01)

(52) U.S. Cl.
CPC .......... *G06Q 20/105* (2013.01); *G06Q 20/40* (2013.01); *G06Q 40/12* (2013.12)

(56) References Cited

U.S. PATENT DOCUMENTS

| | | | |
|---|---|---|---|
| 5,448,047 A | 9/1995 | Nair et al. | 235/440 |
| 5,450,477 A * | 9/1995 | Amarant et al. | 379/114.17 |
| 5,592,378 A | 1/1997 | Cameron et al. | 705/27 |
| 5,621,201 A | 4/1997 | Langhans et al. | 235/380 |
| 5,630,073 A | 5/1997 | Nolan | 705/45 |
| 5,638,519 A | 6/1997 | Haluska | 705/28 |
| 5,663,547 A | 9/1997 | Ziarno | 235/44 |
| 5,842,185 A | 11/1998 | Chancey et al. | 705/40 |
| 5,864,830 A | 1/1999 | Armetta et al. | 705/41 |
| 5,875,435 A * | 2/1999 | Brown | 705/30 |
| 5,875,437 A | 2/1999 | Atkins | 705/40 |
| 5,911,136 A | 6/1999 | Atkins | 705/36 |
| 5,991,750 A | 11/1999 | Watson | 705/44 |
| 6,058,375 A * | 5/2000 | Park | 705/30 |
| 6,353,811 B1 * | 3/2002 | Weissman | G06Q 20/04 705/40 |
| 2001/0034677 A1 * | 10/2001 | Farhat | G06Q 20/02 705/30 |
| 2002/0063153 A1 * | 5/2002 | Stack | G06Q 20/04 235/380 |
| 2003/0204470 A1 * | 10/2003 | Manchester | G06Q 20/10 705/39 |
| 2005/0060584 A1 * | 3/2005 | Ginter | G06F 21/10 726/4 |
| 2008/0109358 A1 * | 5/2008 | Kottmeier, Jr. | G06Q 40/08 705/44 |
| 2008/0215470 A1 * | 9/2008 | Sengupta | G06Q 40/00 705/35 |

OTHER PUBLICATIONS

Credit Card Management, "The GSA Blesses Six Card Issuers", Mar. 1998.
Cybermark, cybermark: stored value, "solutions", "smart card systems, smart card communities", copyright 1998, CyberMark.
Emerson Brown & Jim Baumgartner, Corporate Cashflow, vol. 15, No. 12, Nov. 1994, pp. 28-29.

\* cited by examiner

SYSTEM INTEGRATING CREDIT CARD TRANSACTIONS INTO A FINANCIAL MANAGEMENT SYSTEM

CROSS REFERENCE TO RELATED APPLICATIONS

This application is a Continuation of U.S. application Ser. No. 09/140,795 filed Aug. 26, 1998 now U.S. Pat. No. 6,343,279.

BACKGROUND OF THE INVENTION

Field of the Invention

The present invention is directed to a system that accounts for credit card transactions within a financial management system where credit card purchases are automatically reconciled to the proper accounts based on credit card number and, more particularly, to a system in which card transactions are subject to controls associated with internal financial system limits such as single purchase limits, account limits, budget limits, etc. which are independent of the credit card company issuer limits and which are set prior to the actual transaction.

Description of the Related Art

Credit card transactions are becoming an ever more prevalent method of making purchases by large organizations, particularly small purchases of consumer type items needed on an immediate basis. Organizations want to maintain control over the continuously growing number of these transactions. Such organizations typically operate a financial management system such as Momentum™ Financials available from American Management Systems, Inc. (AMS). Typically, such systems record credit card activity after the fact. An interface reads the credit card files supplied by the credit card company and creates transactions within the system to reflect the purchases and provide for payment. Such systems do not provide for automatic internal controls. Typically, reconciliation for credit card transactions is a paper based process which requires each cardholder to review all of their own card transactions and compare them with vendor invoices or a personal ledger of credit card transactions that the individual keeps.

What is needed is a system that provides the automatic controls and tools necessary to properly account for and manage credit card activity within a financial management system.

SUMMARY OF THE INVENTION

It is an object of the present invention to provide a system that subjects credit card purchases to internal company credit limits and single purchase controls in addition to controls implemented by the credit card company.

It is also an object of the present invention to subject credit card purchases to internal controls, including budgetary, financial planning, project and general ledger controls, prior to the occurrence of the actual transaction.

It is another object of the present invention to provide a financial management system that completely tracks credit cardholders, individual credit limits and default accounting codes for each credit card authorized within the financial management system.

It is an additional object of the present invention to provide for the accounting of credit card transactions through all stages of the transaction including requisition and/or obligation which precede the actual card transaction through to payment to the credit card company.

It is a further object of the present invention to provide for automated handling of disputes over card purchases.

It is an object of the present invention to provide a system that automatically reconciles the recorded financial transactions and the card activity as recorded by the card company.

It is another object of the present invention to provide access to credit and information in the financial system to cardholders through the Internet.

The above objects can be attained by a system that controls and accounts for credit card transactions within a financial management system. The invention places limits on the card transactions and ensures that the transactions comply with budget, financial planning and general ledger controls. The transactions can be obligated prior to or during the actual transaction with the bank and thereby subjected to the controls of the financial management system. The invention provides for the complete reconciliation of the credit card transactions with bank records after the transactions occur. The system automatically reconciles the transactions recorded by the bank with those recorded in the financial system and updates budgets, plans, projects, and general ledger entries accordingly.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
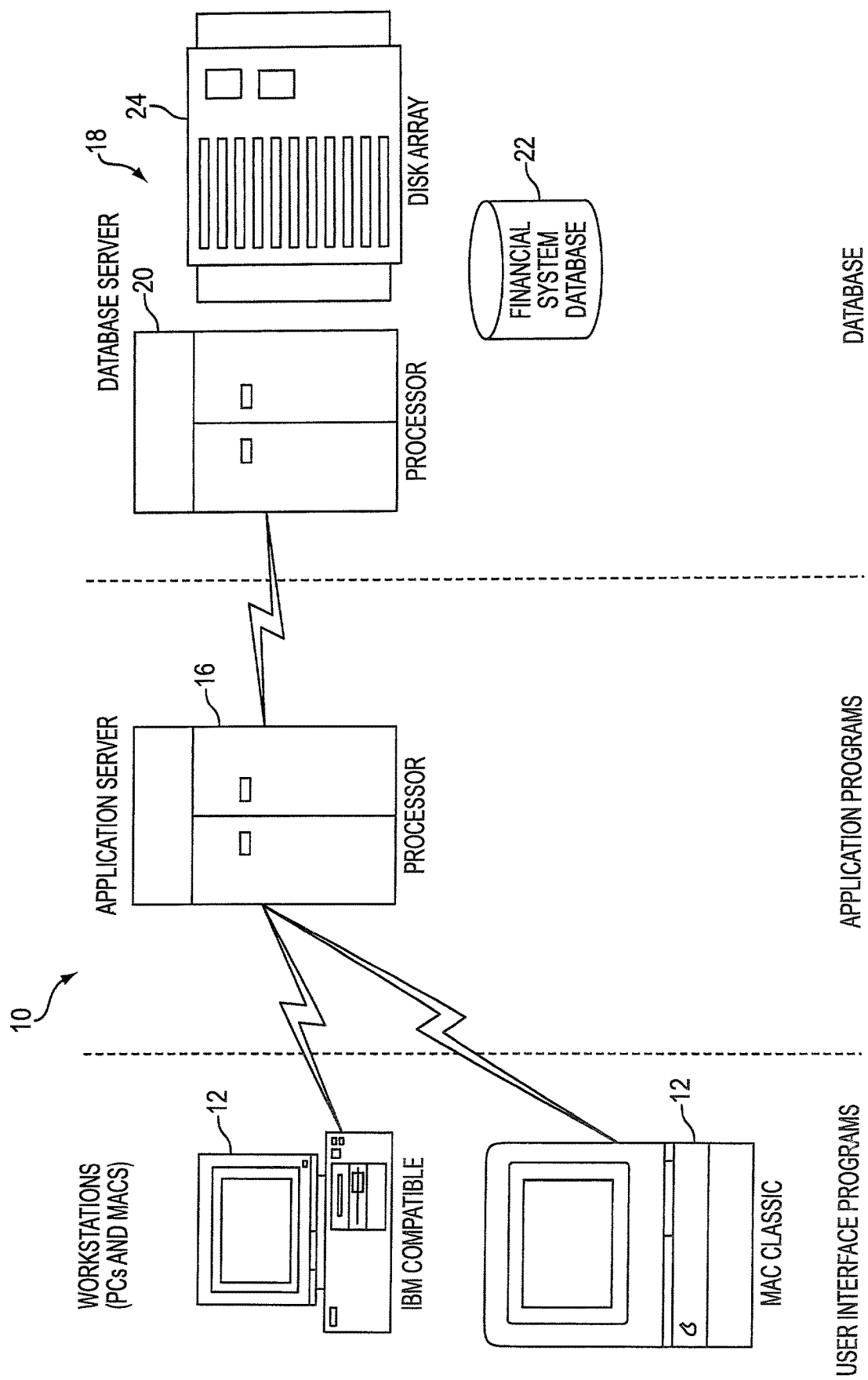
FIG. 1 illustrates an architecture of the present invention.

The present invention is directed to a system designed to provide for the control and accounting for credit card transactions within a financial management system. The financial management system would typically be used by a company seeking to track and control small purchases generally made via credit card. However, the system is also useful for state and federal government agencies that desire the same level of tracking. The system provides several levels of control for managing credit card transactions while also ensuring that the credit card transactions conform with the standard budget, financial planning, and general ledger controls used for standard financial transactions.

Rather than simply accounting for credit card transactions after the fact, the system allows credit card transactions to be captured prior to the actual transaction with the bank, in the form of a requisition or an obligation, and subjected to the controls of the financial management system. Each card transaction is subjected to the standard financial management system controls for funds availability and security as well as controls for internally managing purchase limits for the employee cardholders. Transactions passing the controls are recorded using the appropriate general ledger accounts for the type of transaction.

The system provides for the reconciliation of the credit card transactions with the bank records after the transactions actually occur. Any discrepancies are flagged and identified for user intervention. The system performs the necessary updates, including budget, financial planning, project, and general ledger updates and the liquidation of open items, to indicate that the transaction has been completed. The system also allows cardholders to identify disputes and track the dispute correspondence with the card issuer.

The system tracks each credit card and its relevant information including card number, cardholder, issuing company, expiration date, etc. The system allows internal credit limits including billing cycle limit and single purchase limits to be assigned for each credit card or a group of cards. These limits, which for convenience are called financial system limits, are to be enforced within the financial management system and operate independently of any credit limits imposed by the issuing company, which for convenience are called issuer limits. These limits are used when a transaction is to be approved at the time of a purchase, during obligation and approval. In addition to limits, the system allows a default accounting distribution or default account codes to be assigned to each card where effects of the transaction are recorded within the financial management system.

With the integrated system of the present invention, an organization may require credit card purchases to be recorded in the financial system prior to their actual occurrence. The system allows such anticipated credit card purchases to be recorded as obligations. As these obligation transactions are recorded, they are subjected to the standard financial controls, which may include budget, financial plan, and project funds availability checks, and the standard security controls, which may include user ID and password checks as well as secondary approvals based on the transaction dollar amount and/or the type of goods to be purchased.

When an organization uses the feature of obligating credit card purchases before they occur, the system tracks each anticipated purchase and stores the information needed to later reconcile the purchase with the credit card statement. As obligations for credit card purchases are processed, the system verifies that the credit card's single purchase limit and billing cycle purchase limit are not exceeded.

An important element of the system is the automated reconciliation function. For each billing cycle, the credit card company provides an electronic file with the details of the credit card purchases, essentially the credit card statement. The system automatically loads the contents of the statements file into a database and allow users to reconcile purchases, register disputes, and/or trigger payments to the credit card company.

When an organization employs the model of committing or obligating credit card purchases before the transaction is received from the bank, the system performs an automatic reconciliation between the outstanding requisitions and obligations in the system and the credit card statement records received from the bank or credit card company. When a match is found, the credit card transaction is marked as reconciled and eligible for payment. The system is flexible in that the organization can determine if the reconciled transactions can be paid upon reconciliation or whether the credit cardholder or his supervisor must still approve the actual payment of the transaction.

At the time a credit card transaction is reconciled and/or approved, the user has the opportunity to alter the internal accounting codes (or override the default codes) associated with the transaction. If payment for the credit card transaction has already been made and the accounting codes have been altered, the system backs out the updates associated with the original accounting codes and performs the updates needed for the new accounting codes. The back-out and re-do of the updates ensures that the proper budgets, financial plans, projects, and general ledger account balances have been updated to reflect the true accounting codes of the credit card transaction.

An organization has the option to immediately pay the credit card company upon receipt of the statement information or to delay payment until each credit card transaction is reconciled by the actual purchaser. When immediate payment is chosen, the system generates payment authorizations which are processed to allow for the disbursement of funds through the organization's own payment authority, such as the company treasurer or if the payment authority is the U.S. Treasury to authorize a disbursement through the U.S. Treasury's electronic payments and checks systems. When the immediate payment is not used, payments are warehoused until the credit card transactions have been reconciled using information from either the initial obligation and/or the statement received from the credit card company.

When the payment authorizations are generated and processed, the accounting codes are taken from the credit card set-up information. This allows the appropriate budgets, projects, general ledger accounts, and financial plans to be updated as the payments and subsequent disbursements are processed.

The present invention is preferably implemented in an application architecture 10 as depicted in FIG. 1. Workstations 12 interact, via a suitable interface program, with an application server 16 which accesses data of the financial management system within a database server system 18 where a processor 20 accesses a financial system database 22 stored within a disk array 24. The work-stations 12 can be typical desk top computers. The work-stations 12 can be connected to the system 16 directly or via a packet-switched network, such as the Internet. Typically, a company (or possibly a government agency) will have a multitude of such work-stations 12, allowing each employee access to the system. The database server 20 can also be similarly connected via such a packet-switched network.

Figure 2:
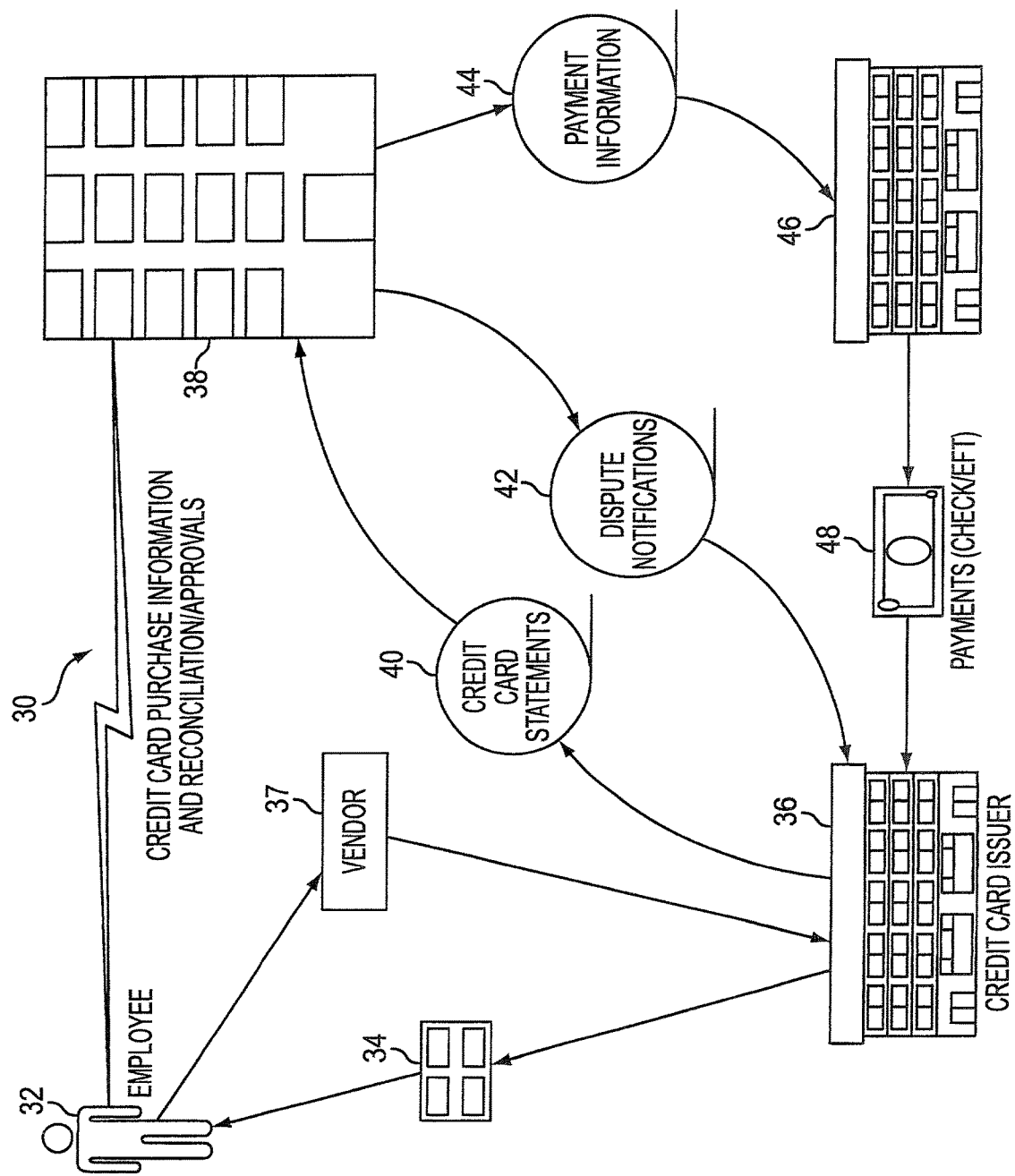
FIG. 2 shows a system model of a system according to the present invention.

Although not shown in this figure, the system 10 communicates with a credit card issuer 36 as well as a payment authority 46 (see FIG. 2). Typically, these communications are via a magnetic media, such as tape. However, direct connections or connections over a packet-switched network are also within the architecture contemplated by the system described herein.

The architecture 10 preferably executes a financial management system, such as Momentum™ Financials available from AMS, that performs basic financial management operations such as comparing purchases to budgets, etc. A suitable operating system for the architecture 10 is the UNIX operating system or the WindowsNT operating system while a suitable set of programming languages include using C++ for server components, Smalltalk for the screen (desk top) components and JAVA for the Web version of the screen components. The computers of the architecture include the computer readable storage (RAM, ROM disks, etc.) upon which the processes and data structures of the present invention can be stored and distributed to customers, if desired. The processes can also be distributed to purchasers via downloading over a network, such as a packet switched network using an electromagnetic wave, such as a carrier wave.

The credit card financial management system of the invention operates in an environment having a system model 30, as shown in FIG. 2, where an employee 32 is issued a credit card 34 by a credit card issuer 36, such as a bank, as authorized by the company/employer 38 of the employee 32. The employer 38 can be a corporation or a government agency, such as the U.S. Patent and Trademark Office. The employer 38 uses the system of the present invention. Typically, the employee 32 makes a credit card purchase with a vendor 37. The vendor 37 communicates the transaction to the issuer 36 and the purchase is communicated to the company 38 by the issuer 36 via an electronic credit card statement 40. If necessary, the statement is used by the system to reconcile the purchase, with assistance of the employee 32 via an Internet session, for example, or to create an electronic dispute record 42 communicated to the issuer 36. When the purchase is reconciled electronic payment authorization information 44 is communicated to a payment authority 46, such as a company treasurer or the U.S. Treasury. The payment authority 48 makes a payment (electronic or check) to the issuer 36.

Prior to discussing the processes of the present invention in detail with respect to FIGS. 3-23, three types of credit card transactions that the system is designed to handle will be briefly discussed.

Prior to credit card transactions being processed by the credit card financial management system, information needs to be provided to the system that will authorize a particular person and credit card to initiate transactions within the system. This card set-up is performed from one of workstations 12 where information associated with the cardholders name, the card number, the card issuer, purchase limits for a billing cycle and a single purchase, default account codes, processing rules (approvals) for this card, etc. are stored in, the system. Some of this information, such as credit card number is obtained from the credit card bank 36, either via a paper/verbal communication with the bank 36 or via an electronic transaction with the bank 36. If the card transactions are to be approved at the time of purchase by the financial management system, this information is communicated to the bank 36.

In a first type of transaction, which for convenience is called an non-preapproved transaction, the cardholder purchases an item at a vendor 37 and, after the normal processing by the bank or credit card issuer 36, the bank 36 transmits the transaction to the system. The purchase transaction can arrive on a recording medium such as a traditional tape or as an electronic transaction over a communication network, such as a packet-switched network, as previously mentioned. The system automatically checks the transaction against all limits, and if the transaction meets all the approval criteria for this card, it processes that transaction using the rules designated for this card debiting the default accounts and issuing a payment authorization to the payment authority 46. The payment authority 46 makes the payment to the bank 36. If the transaction does not pass the internal checks, such as exceeding an internal company single purchase limit or would cause a budget item to be exceeded, the transaction can be flagged for internal resolution. The system can be configured to go ahead and authorize payment for the purchase or it can be held. In either case the cardholder, supervisor or other person with sufficient authority is notified by an appropriate message. This person accesses the system and performs the operations necessary to resolve the transaction.

In a second type of transaction called a preapproved transaction, the cardholder accesses the system through the work-station 12 and creates an obligation. An obligation is a transaction in which the amount of the transaction can be anticipated, the product to be purchased is known, the vendor is known, the account codes of the accounts/budgets affected by the transaction are known, etc., and one which has been approved. It is a transaction for which the system recognizes that approval for the credit card purchase has been previously authorized. The user then makes the purchase at the vendor 37 and when the purchase transaction arrives from the bank 36, the system essentially transmits a payment authorization to the payment authority 46 and then reconciles the transaction by debiting the proper accounts, etc. If a dispute arises, a mechanism is available to credit the company 38 for the transaction in a later payment authorization.

In a third type of transaction, called an interactive transaction, at the time of the purchase at the vendor 37, after the purchase has passed the limit processing of the bank 36 but before the bank 36 sends an approval back to the vendor 37, the bank 36 sends a approval request to the system. This approval request includes the card number, the amount of the purchase, the vendor and a product/service code (typically one designated by the U.S. government or some other entity). The system, at a minimum, checks the amount of the purchase against the internal card limits set by the cardholder's company 38 and returns an approval or disapproval response based on the determination. The system before approving the purchase can make checks other than just checking the credit card internal limit. For example, using the product code, the system can also check to see if the transaction is of a type that matches an authorized account for this cardholder. For example, if the product code indicates that a personal computer is being purchased but the cardholder is not authorized to spend money from a computer purchase account, the transaction can be disapproved. When the actual purchase transaction arrives later at the system from the bank 36, the transaction is processed as previously discussed.

This third type of transaction allows additional features to be provided for a company 38. For example, when a transaction has been preapproved by the creation of an obligation and the approval request arrives from the bank 36, the system, in addition to approving the transaction, can substantially immediately send a payment authorization to the payment authority 46 which could pay the bank 36 before the end of the billing cycle in which the actual transaction occurred. Such early payment would allow the bank 36 to provide the company 38 with more favorable credit card credit terms or discounts.

The details of the processes that allow these transactions to be processed by the system of the invention are discussed below.

Figure 3:
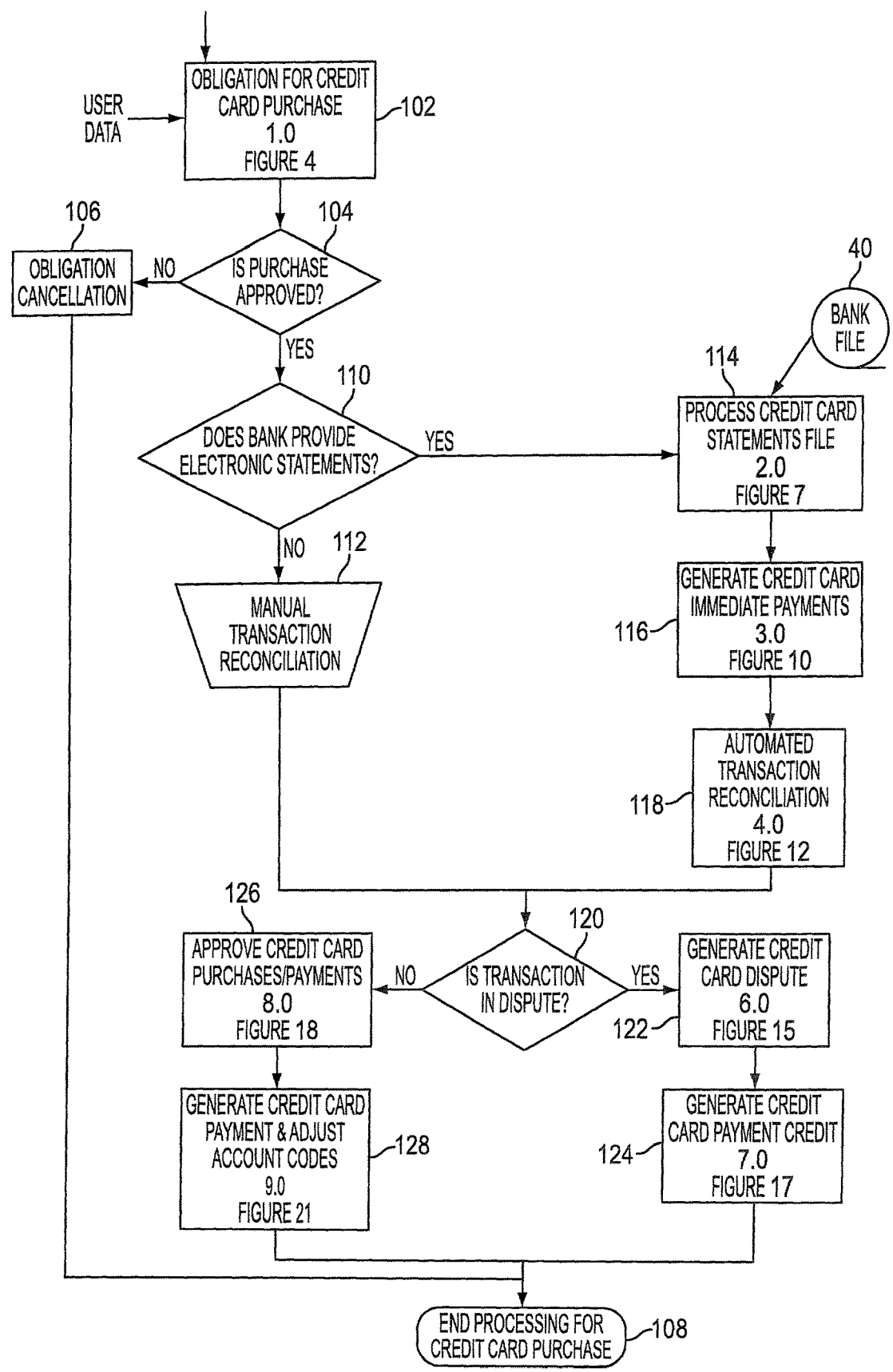
FIGS. 3-21 depicts the flow of processing when the purchase is not interactive.

The credit card purchasing process can begin, as depicted in FIG. 3, with the employee 32 creating 102 an obligation for a credit card purchase where the system checks to determine whether the purchase is within the various purchase and budget limits. This obligation creation step inputs the credit card information as well as the necessary accounting information. This processing 102 will be discussed in more detail with respect to FIG. 4. Next, the system determines 104 whether the purchase has been approved. If not, the obligation is canceled 106 and processing ends 108.

If the obligation has been approved, the system then determines 110 whether the credit card issuer provides an electronic credit card statement. If so, the transaction can be processed electronically and if not a manual reconciliation process is performed 112 where the employee 32, and others necessary to the reconciliation process, are provided with information, via screen displays on the work-stations 12, allowing the employee 32 to confirm whether the purchase is correct and should be paid. In this process the employee 32 is presented with the credit card statement, reviews the statement against purchase receipts and other personal notes and indicates whether the purchase is correct or in dispute. The purchase can be in dispute for a number of different reasons, such as the purchase amount on the statement being incorrect due to returns of part of the purchase which is a dispute with the bank 36 or because the employee is not satisfied with the purchased items which is a dispute with the vendor 37.

If the bank 36 does provide electronic statements 40, the system processes 114 the credit card statements file. This step 114 can also be an entry point into the processes of the invention. This operation 114 essentially maps the format of the statement to the format of the records of the financial management system, such as Momentum™ Financials. This process 114 will be discussed in more detail with respect to FIG. 7. Next, the system generates 116 immediate payments on the credit card, if any are to be generated, which results in a payment authorization being sent to the payment authority 46 based on an unreconciled statement rather than after reconciliation has occurred. Any disputes are handled via credits whenever payment is generated immediately upon receipt of the statement. By being able to pay for the transactions on the statement substantially immediately, the company 38 can seek better credit terms or a discount. In this process, if the card issuer 36 provides discounts for early payment, the "income" associated with the discount can also be calculated. This process 116 is discussed in more detail with respect to FIG. 10. Automatic reconciliation 118 occurs next and includes essentially matching the amounts of obligations to the credit card statement transactions. If matches exist the credit card transaction is marked as reconciled and otherwise it is manually reconciled. The process 118 is discussed in more detail using FIG. 12.

Once reconciliation has been performed, the system determines 120 whether any disputes exist. If so, the system generates 122 a dispute, which identifies the card number, the transaction, the amount, the type of dispute (vendor or bank) and the employee's justification for the dispute, such as double debits. The dispute is then sent to the bank 36. This process 122 will be discussed in more detail using FIG. 15. The system then generates 124 a payment credit (or offset) for the credit card for the transactions in dispute which is held until a later processing cycle when the dispute can be resolved. This operation 124 is discussed later herein with respect to FIG. 17.

If there are no disputes, the system performs a second approval process 126 where the credit cardholder 32 can review and approve (or disapprove—reject) the transactions, as long as they are within the employee's approval limits. The employee can also change the account codes indicating where the transaction is to be posted. A credit card group holder, a person at the company 38 responsible for a group of employees having credits cards, can also review and approve (or disapprove) the transactions at a different limit level. This process 126 will be discussed in more detail with respect to FIG. 18.

Next, the system generates 128 payments and, if necessary, adjusts the account codes of the credit card transaction with respect to what accounts within the financial management system are affected. A transaction which is set up for immediate payment is paid using a set of default account codes that are set at the time the credit card is issued to the employee 32. When the transaction is reviewed for reconciliation and/or approval the employee may have changed the account codes to allocate the purchase to an account that is different from the default account. This operation 128 essentially internally backs the transaction out of the default accounts within the financial management system and enters it into the accounts selected during the reconciliation and approval process. These processes 128 will be discussed in more detail later with respect to FIG. 21.

Figure 4:
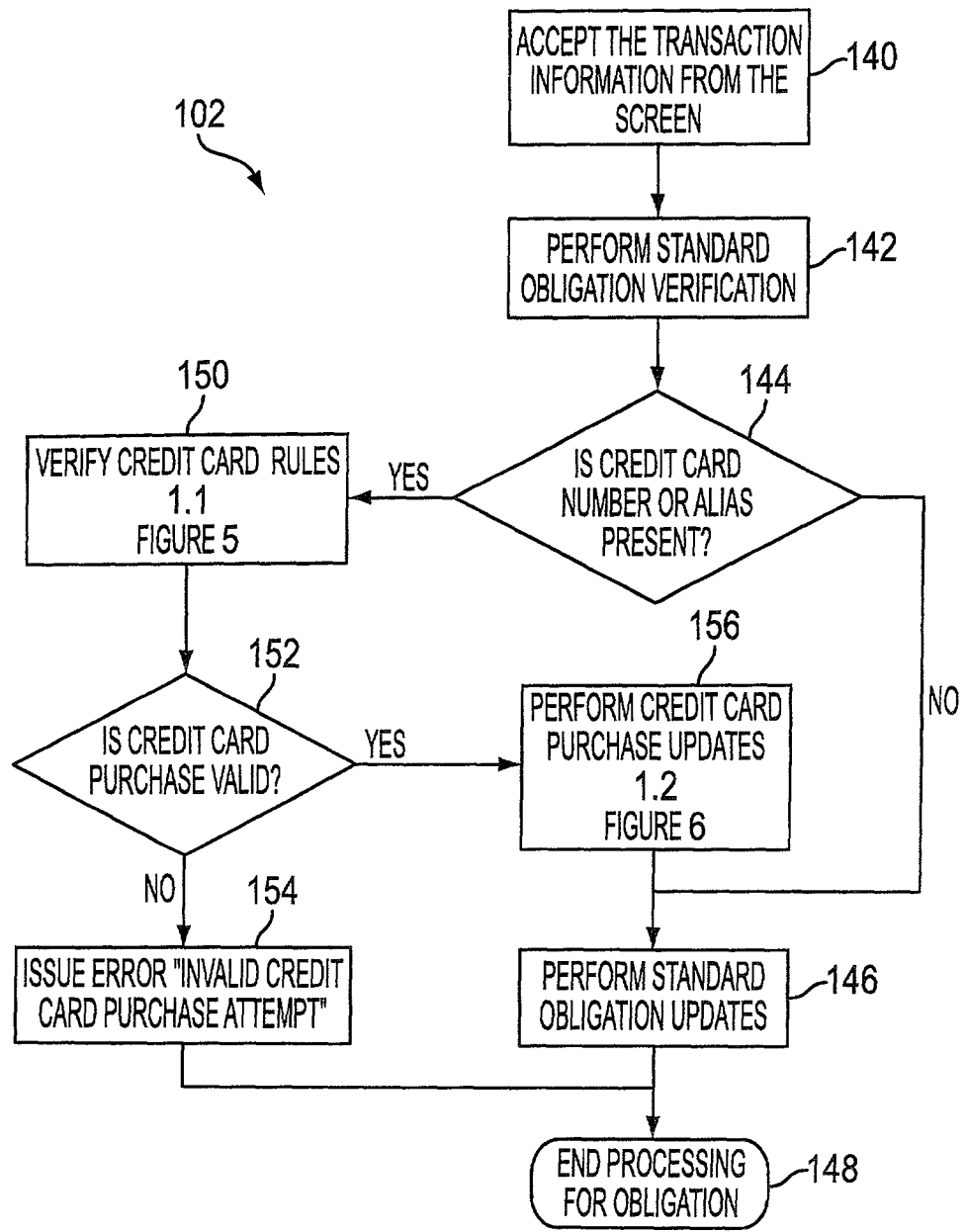
Figure 5:
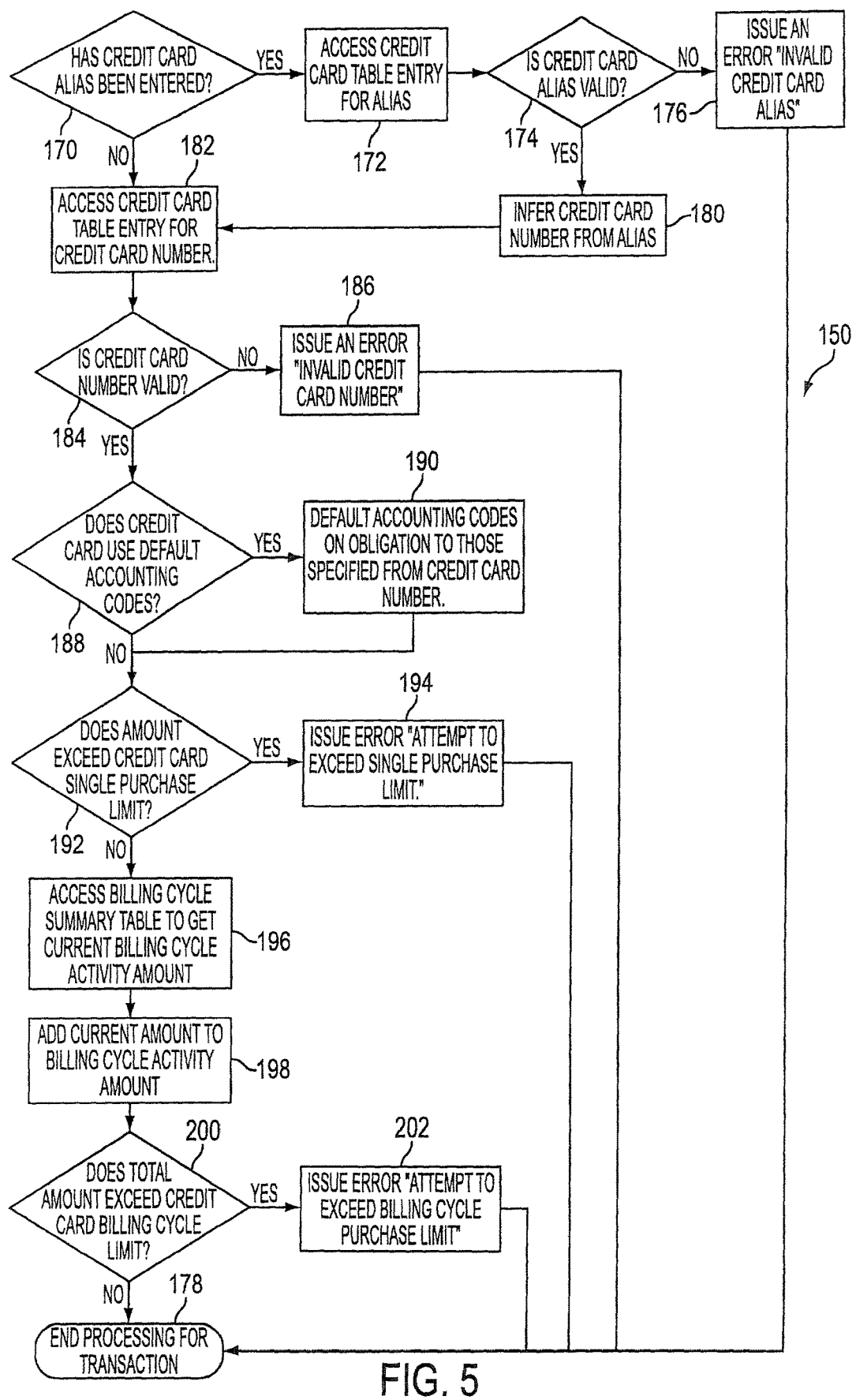

The obligation process 102 starts with the employee entering 140 the transaction information via the work-station 12 as illustrated in FIG. 4. This information, if it is an itemized or detailed obligation, can include the amount of the intended purchase, the vendor, the type of purchase (typically using the standard government codes for products/services), the account codes for the purchase, etc. If the obligation is being created after the purchase, such as when the employee 32 has made a telephone purchase with the credit card, the information can also include the approval code issued to the vendor 37 by the bank 36 and other information that may be included on an invoice, such as date, time, product or service code, vendor and vendor location. This information is checked 142 for validity using the standard validation criteria and processes of the financial management system, such as Momentum™ Financials. Additionally, checks of the budget, financial plan, and project balances associated with the accounts are made to determine whether the purchase is within the funding associated with the employee and the accounts. Next, the system determines 144 whether the information being processed includes an actual credit card number or an alias. Aliases are used when the access to the actual card number needs to be restricted, such as when a clerk is entering information from an obligation form.

If neither an alias nor a credit card number is present, the system performs 146 standard obligation updates as typically occur in a financial management system, such as Momentum™ Financials, and obligation processing is complete 148.

If an alias is present, the system accesses the credit card table to infer or determine the true credit card number and continue processing. The credit card table holds information and processing rules pertaining to the individual credit cards such as card number, alias, type, approval group, effective dates, active flag, holder, expiration date, single purchase limit, bill cycle purchase limit, default dispute accounting codes, default payment accounting codes, etc. If the alias is invalid and the credit card number cannot be determined, the system issues an invalid purchase attempt message to the employee 32. If an alias or a credit card number is being used, the system verifies the obligation against the credit card authorization limits for the employee for single purchases and purchases within a billing cycle as well as verifying 150 that the rules for the credit card are not being violated, such as the type of product eligible for purchase, and which will be discussed in more detail using FIG. 5. Next, the system determines 152, from the verification processing, whether the purchase is valid. If not, the system issues 154 an invalid purchase attempt message to the employee 32. If the purchase is valid, credit card updates 156 are performed 156 which essentially includes allocating an obligation amount and an obligation identifier within the financial management system, thereby indicating that an outstanding obligation exists (a set aside or allocation of an amount of purchase authority). This obligation becomes the basis for a reconciliation when the credit card statement arrives from the bank 36. The updating 156 will be discussed in more detail with respect to FIG. 6.

In verifying the credit card obligation against rules and limits 150, the system first determines 170 whether an alias has been entered. If so, alias records in the credit card table are accessed 172 to determine 174 whether the alias is valid. If not, a message is issued indicating that an error in the entry of the alias has occurred and processing ends 178. If the alias is valid, the credit card number is mapped or determined 180 from the alias and the credit card number records in the credit card table are accessed 182 to determine whether the card number is valid. For example, a card can have a valid alias but the card can be beyond the expiration date for the card number. When the card number is not valid, the system issues 186 an appropriate message and ends 178 transaction processing.

If the card number is valid, the system then determines 188 whether the card has been set up to use default account codes. If so, the default codes are set 190 for this obligation and these defaults can be displayed to the employee 32 at the work-station 12 to allow them to be changed.

After processing with respect to the account codes, the system checks 192 the amount of the obligation to determine if it exceeds the single purchase limit for the card and if so issues 194 an appropriate message.

To determine whether a billing cycle limit for the card has been exceeded, the system accesses 196 a billing cycle summary table to obtain the current billing cycle information for this card and adds 198 the obligation amount to the total. If this total exceeds (200) the cycle limit for the card, a message is supplied 202 to the employee 32 indicating that the cycle limit has been exceeded.

Figure 6:
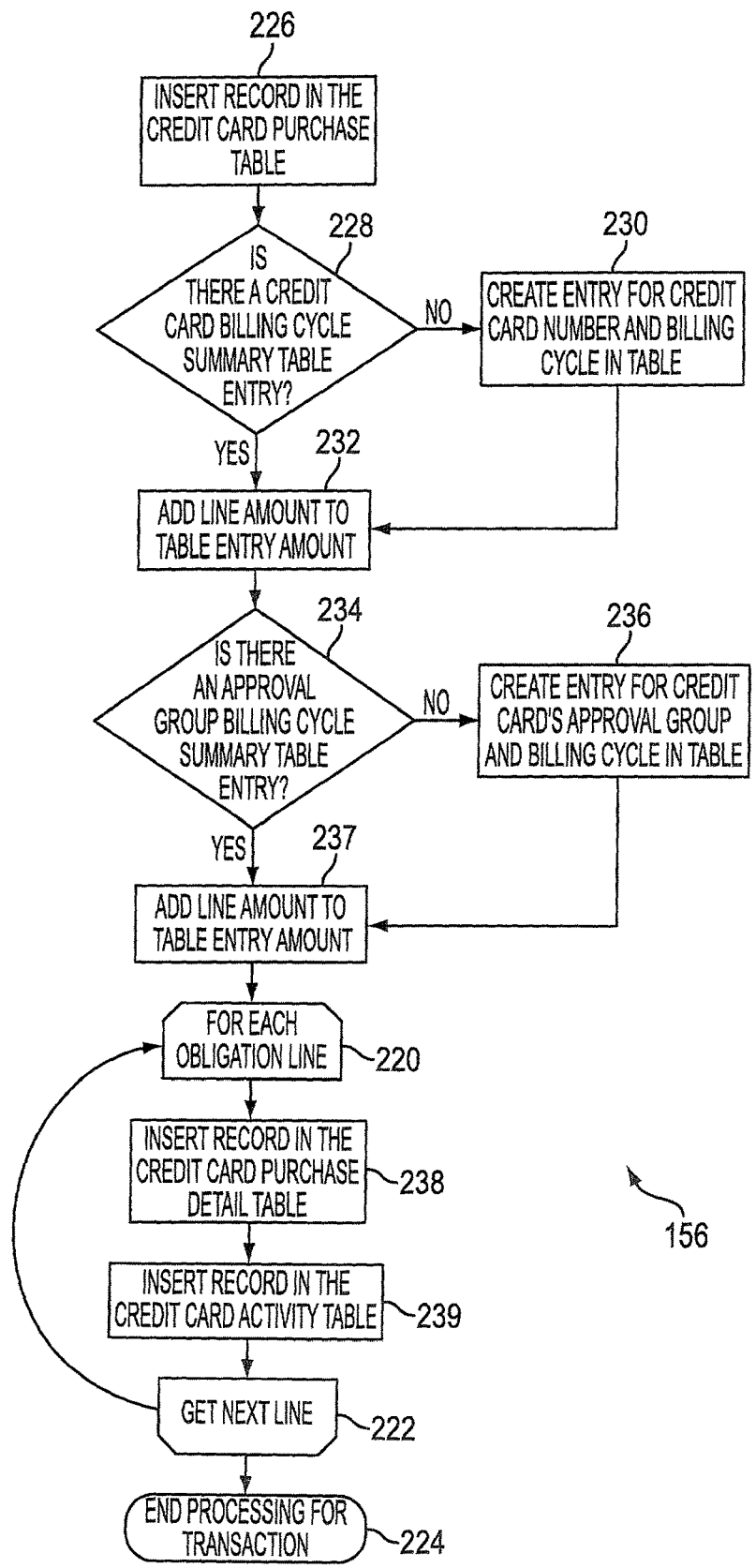

In the credit card purchase updates process 156, the system processes individual obligations in a loop 220-222, as depicted in FIG. 6, where each cycle of the loop corresponds to an obligation that has been created and, when all obligations have been processed, processing ends 224. The process, however, starts with the system inserting 226 a record in the credit card purchase table. The credit card purchase table holds information for each credit card purchase entered into the financial system using the purchase orders or purchase order forms, such as credit card number, purchase order document number, charge date, authorization code, vendor name, city and state, reconciliation status, etc. This insertion operation inserts an entry for the current transaction (an obligation transaction as opposed to an actual credit card purchase transaction which is received from the bank 36) for this credit card in the table that stores the purchase activity for the cards. In this situation the entry includes card number, amount and obligation identifier. Next, the system determines 228 whether there is a billing cycle record for this card and, if there is no cycle record, the system creates 230 a record which includes the information noted above. The system then adds 232 the amount to the card total for the cycle. The system then determines 234 whether a group level billing cycle summary table entry exists for this card, if not an entry is created 236 at the group level and the amount is added 237 to the group total. The loop is then entered and for each obligation line, the record is inserted 238 in the credit card purchase detail table and inserted 239 in the credit card activity table. The credit card purchase detail table holds detailed information for each credit card purchase entered into the financial system using the purchase order forms, such as credit card number, purchase order document number, purchase order line number, purchase amount, reconciliation/liquidation amount, etc. Each entry in this table corresponds to a line or item on a purchase order.

Figure 7:
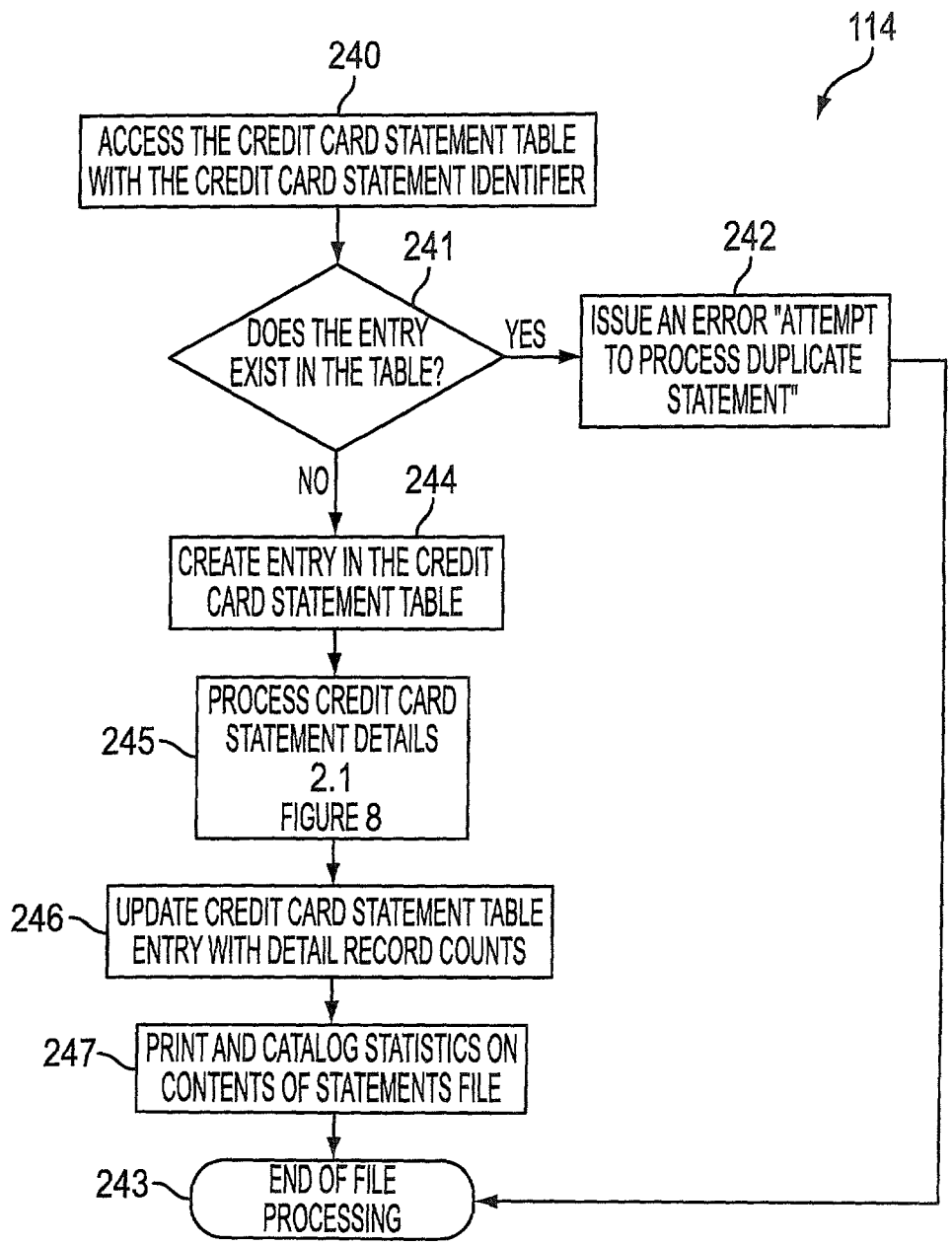

The credit card purchase process where the credit card statements are processed 114, as depicted in FIG. 7, begins by accessing 240 the credit card statements table with the statement ID. The credit card statement table holds information for each credit card statement that has been received from the credit card issuing organization such as statement number, payment due date, total amount due, credit card type, prepayment made flag, prepayment authorization document number, etc. The system then determines 241 whether entry for this statement exists in the table. If so, an error message is issued 242 and the processing ends 243. If not, an entry is created 244 in the table and the statement details are processed 245 which will be discussed in more detail with respect to FIG. 8. Once the statement details are processed, the statement table is updated 246 and the statistics for the processed statement are catalogued and printed 247.

Figure 8:
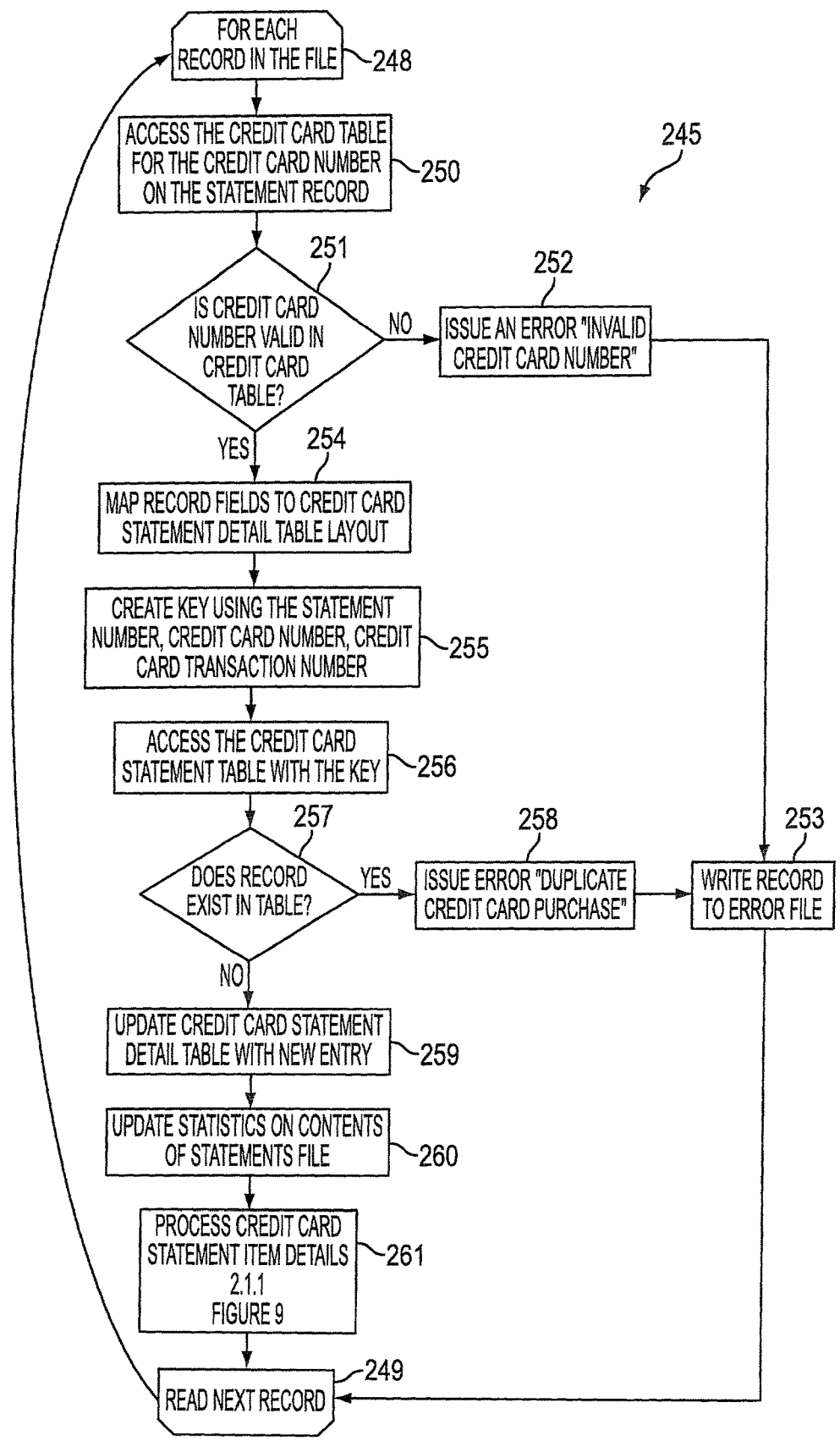

The processing 245 of the statement details, as depicted in FIG. 8, is performed within a loop 248-249 where the records of the statement are processed one at a time.

In this loop, the system accesses 250 the credit card table to obtain that credit card number on the statement and determines 251 whether the number in the statement is valid. If the number is not valid, an error message is issued 252 and a record is written 253 to an error file indicating the type of error. This file will be sent to the bank 36 at the end of processing. If the card number is valid, the system maps 254 the fields of the statement record to the fields of the statement detail table for the credit card maintained by the system. This credit card statement detail table holds detail information for each credit card statement that has been received from the credit card issuing organization including statement number, statement line number, credit card number, transaction number, charge date, posting date, authorization code, vendor name, city and state, payment accounting codes, charge amount, reconciled amount, prepayment authorization line number, reconciliation status, etc. Each entry in this table corresponds to an individual credit card transaction reported on the statement. An optional credit card statement item table can also be used and holds item information for each credit card transaction included in the statement that has been received from the credit card issuing organization, such as statement number, statement line number, detail line number, product/service code, standard industrial code, description, amount, etc. This information can be important for monitoring purchasing trends and identifying credit card abuse. A key to the statement detail table is then assembled 255 using the statement number, credit card number and the credit card transaction number. The credit card statement table is then accessed 256 using the key to determine 257 whether the record for the purchase already exists in the table. If so, it is a duplicate purchase and an error is issued 258. If the record does not exist, the table is updated 259 with the entry and statistics on the contents of the table are updated 260 to reflect such things as the number and types of purchases that were included in each statement file from the bank 36. Next, the item details of the statement are processed 261 which will be discussed below with respect to FIG. 9.

Figure 9:
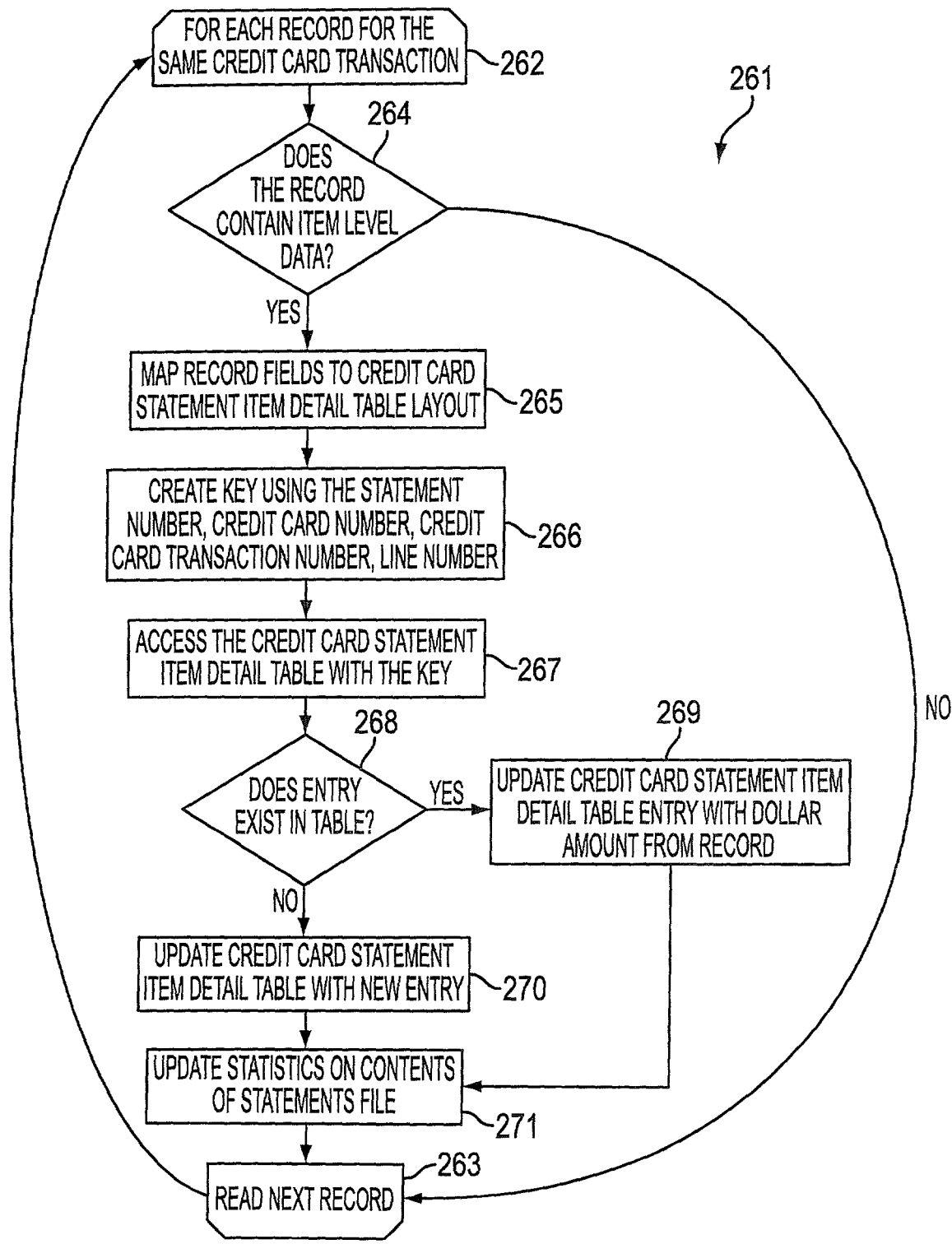

The item details process 261 operates on a per record basis in a loop 262-263 as shown in FIG. 9. The system determines 264 whether the record includes data and an item level. If not, the next record is read 263. If so, the record fields are mapped 265 to the detail table. Next, a key is created 266 and used to access 267 the detail table to determine whether an entry exists in the table. If so, the entry is updated 269 with the dollar amount. If not, the table is updated 270 with the entry. Lastly, the statistics for the statement are updated 271.

Figure 10:
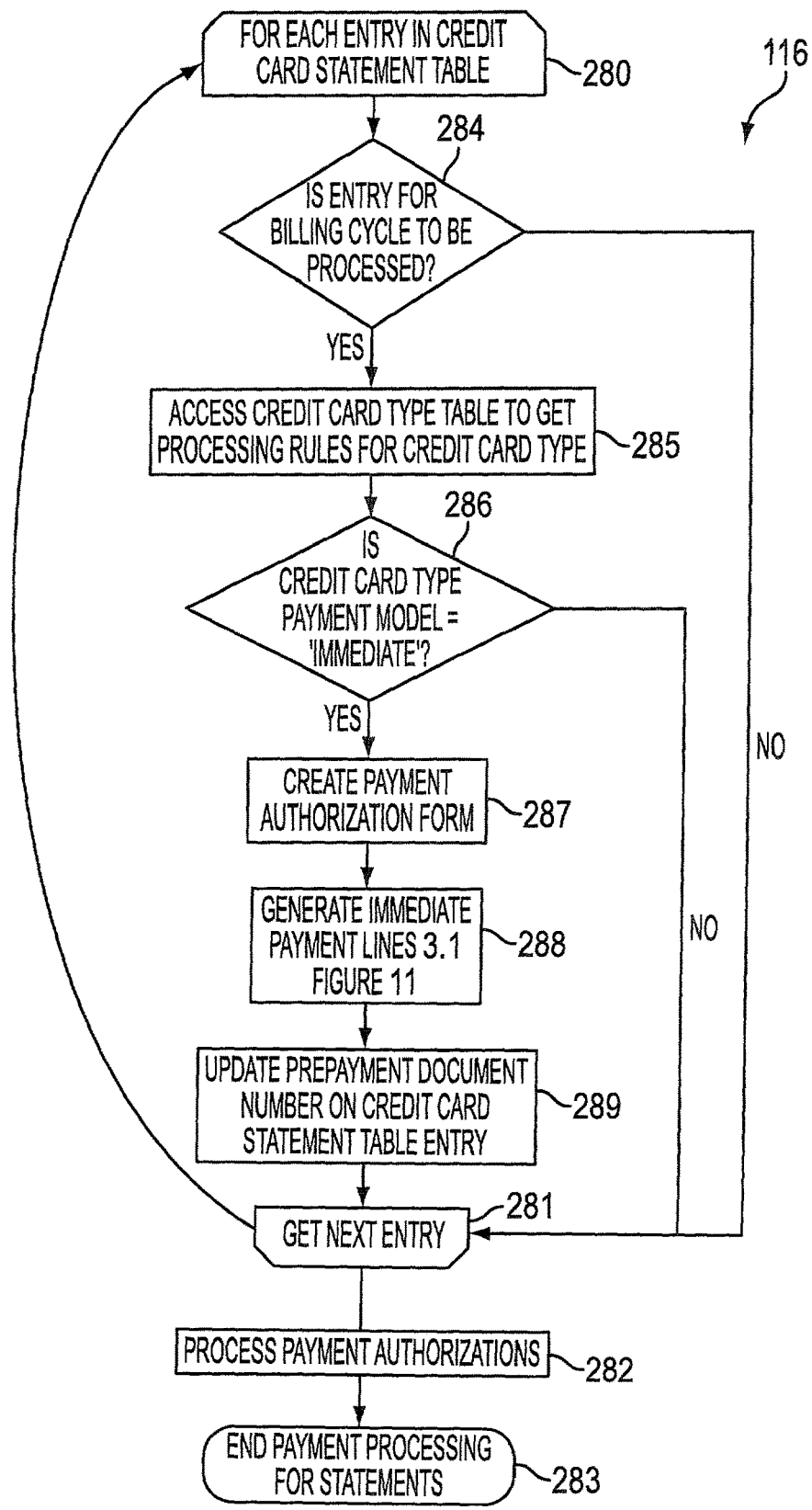

In generating immediate payments 116, as depicted in FIG. 10, the system operates in a loop 280-281 to process each entry in the credit card statements table and payment authorizations are assembled. At the end of this loop the system processes 282 payment authorizations for each card issued and sends them to the payment authority 48 for payment and terminates 283 this operation. In the loop the system first determines 284 whether the statement entry is to be processed in the designated billing cycle. The processing cycle for the company 38 may not match the billing cycle for the bank 36 and only those transactions that fall within the processing cycle of the company 38 are currently processed. If the entry is to be processed, the system accesses 285 the credit card type table to obtain the type for the card. The credit card type table holds information and processing rules, such as whether immediate payment is applicable, pertaining to the valid types of credit cards (e.g., Diner's Club, AMEX, IMPAC) as well as credit card type, number alias, vendor, effective dates, credit card name, active flag, vendor payment address, vendor dispute address, reconciliation method, payment authorization generation flag, default payment accounting codes, amount tolerance, date tolerance, billing cycle end day, etc. The rules for credit card processing are preferably set up based on the type of card. Some cards must be paid at the end of the billing cycle, these type cards typically charge no interest and would be set up for immediate payment. If the type is not set 286 for immediate payment, the processing moves to the next entry. Otherwise, a payment authorization (form) is created 287 for this statement. Next, the immediate payment lines are generated 288, as will be discussed in more detail with respect to FIG. 11. If a discount is to be applied to the immediate payment, the discount terms are established for the credit card issuer in a vendor table. For example, a 2% discount if paid within two days. The payment authorization and subsequent disbursing processing calculate the discount and update the budgets and general ledger with the discount. Then, the statement table is updated 289 to include a prepayment document number entry and reflect that the entry has been paid.

Figure 11:
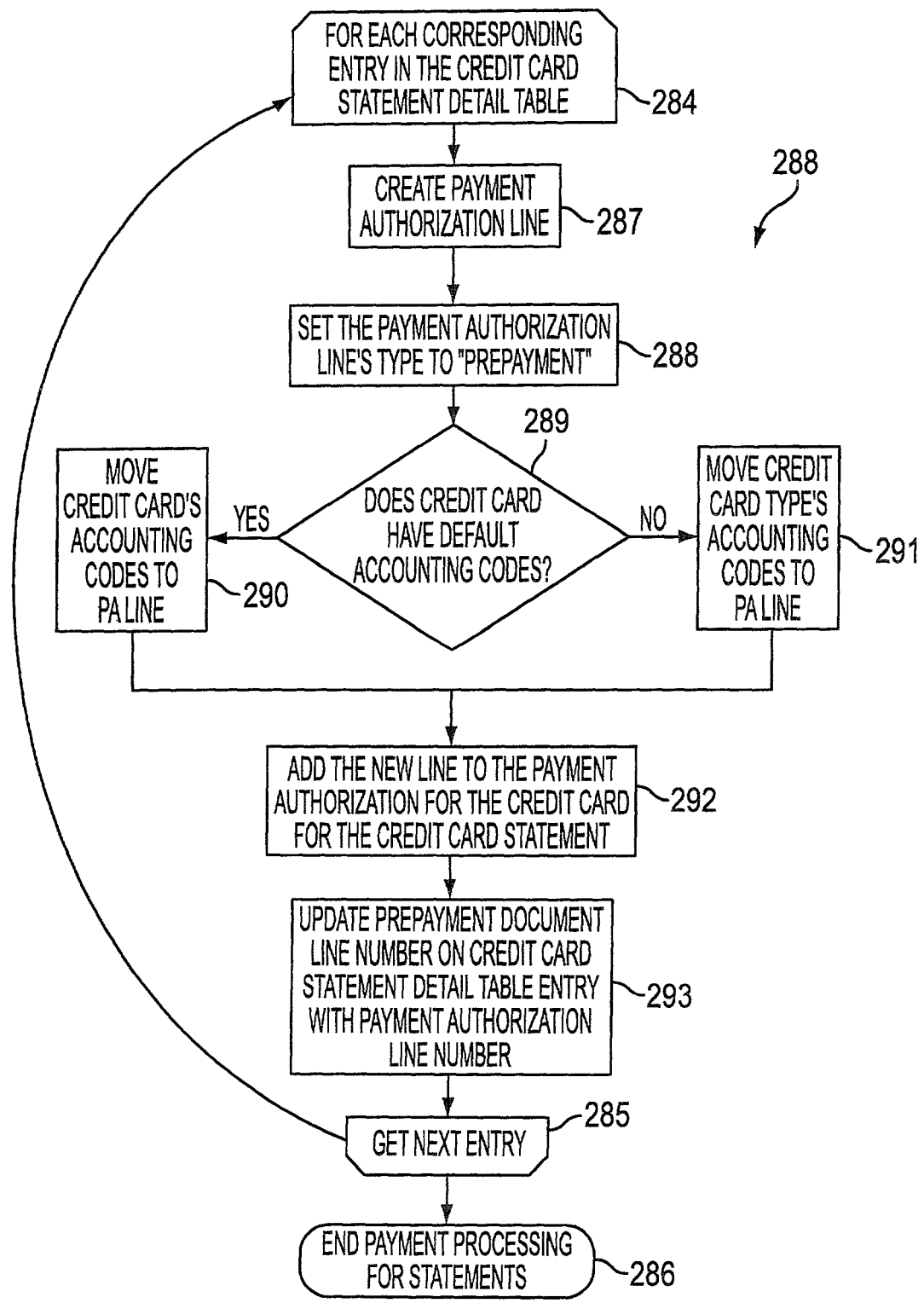

As depicted in FIG. 11, the generation 288 of the immediate payment lines includes a loop 284-285 that processes entries in the detail table until the end of the table is reached and processing is terminated 286. The first step is to create 287 a payment authorization line or specific authorization item in the authorization and set 288 the type for the item to "prepayment" Next, a determination is made 289 as to whether the card has default account codes. If so, the codes are added 290 to the payment authorization line or item. Otherwise, the account codes for the card type are provided 291 for the payment authorization line. The authorization is then added 292 to the file for the particular bank 36 issuing the card and the detail table is updated 293 with the authorization line number.

Figure 12:
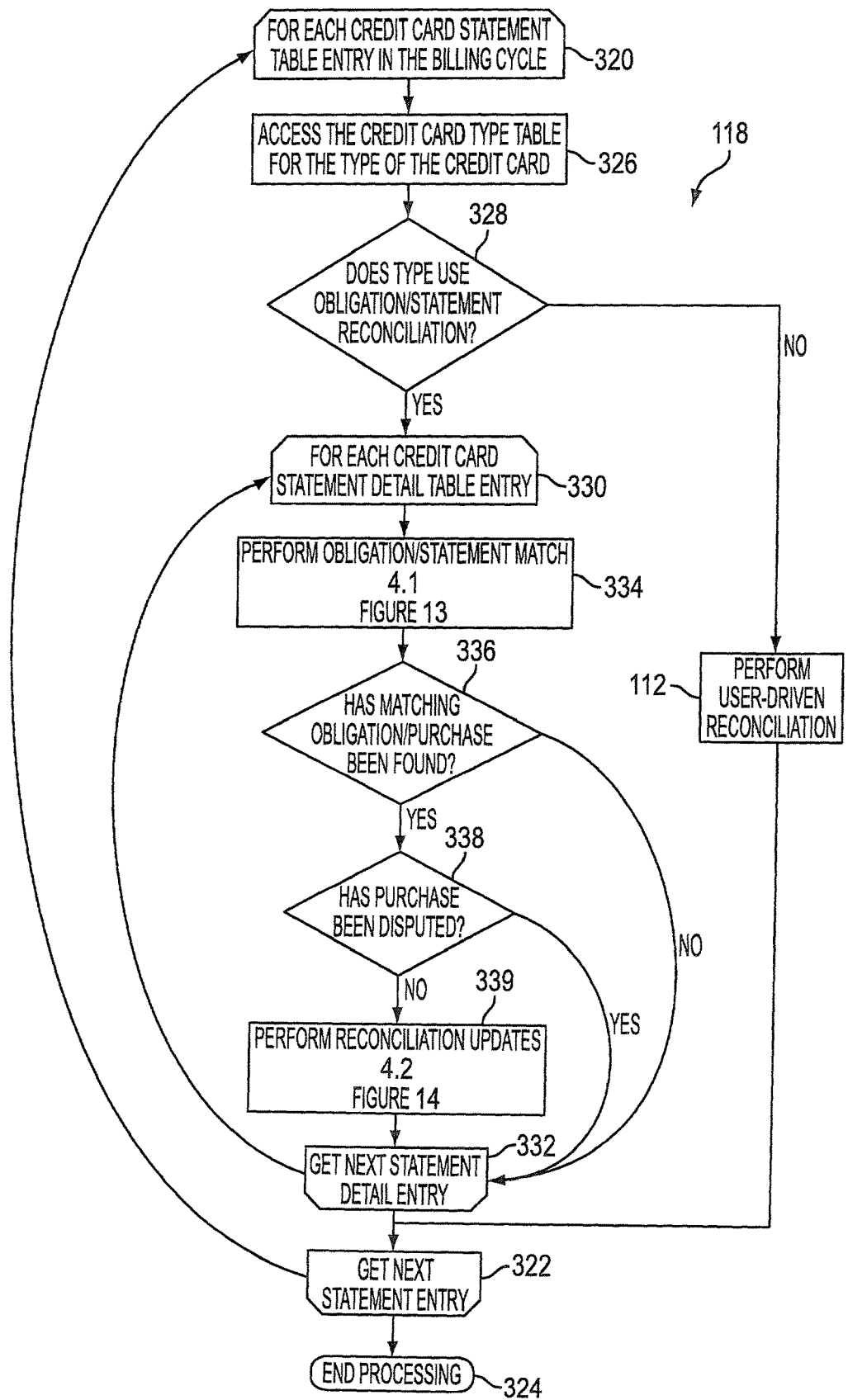
Figure 13:
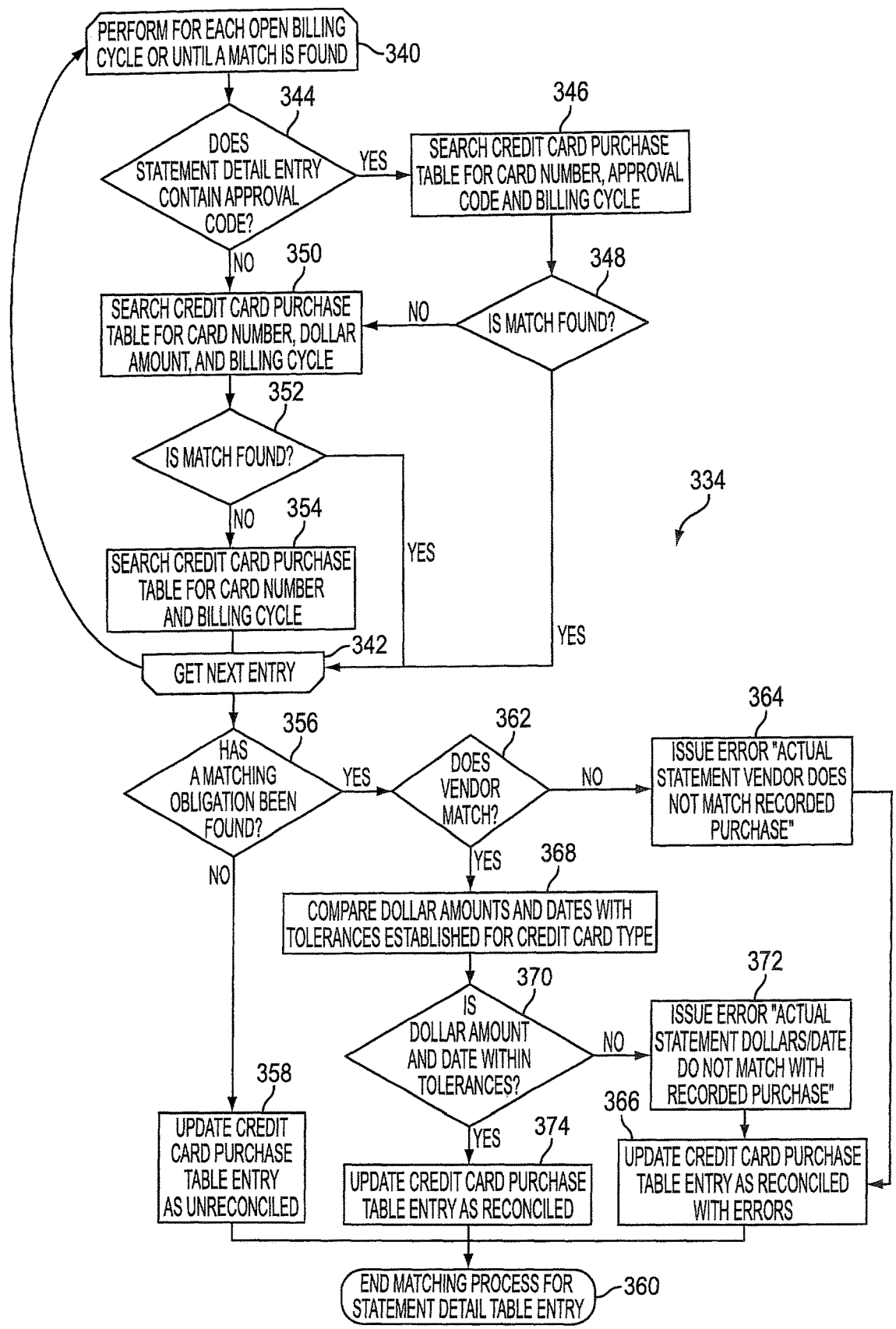
Figure 14:
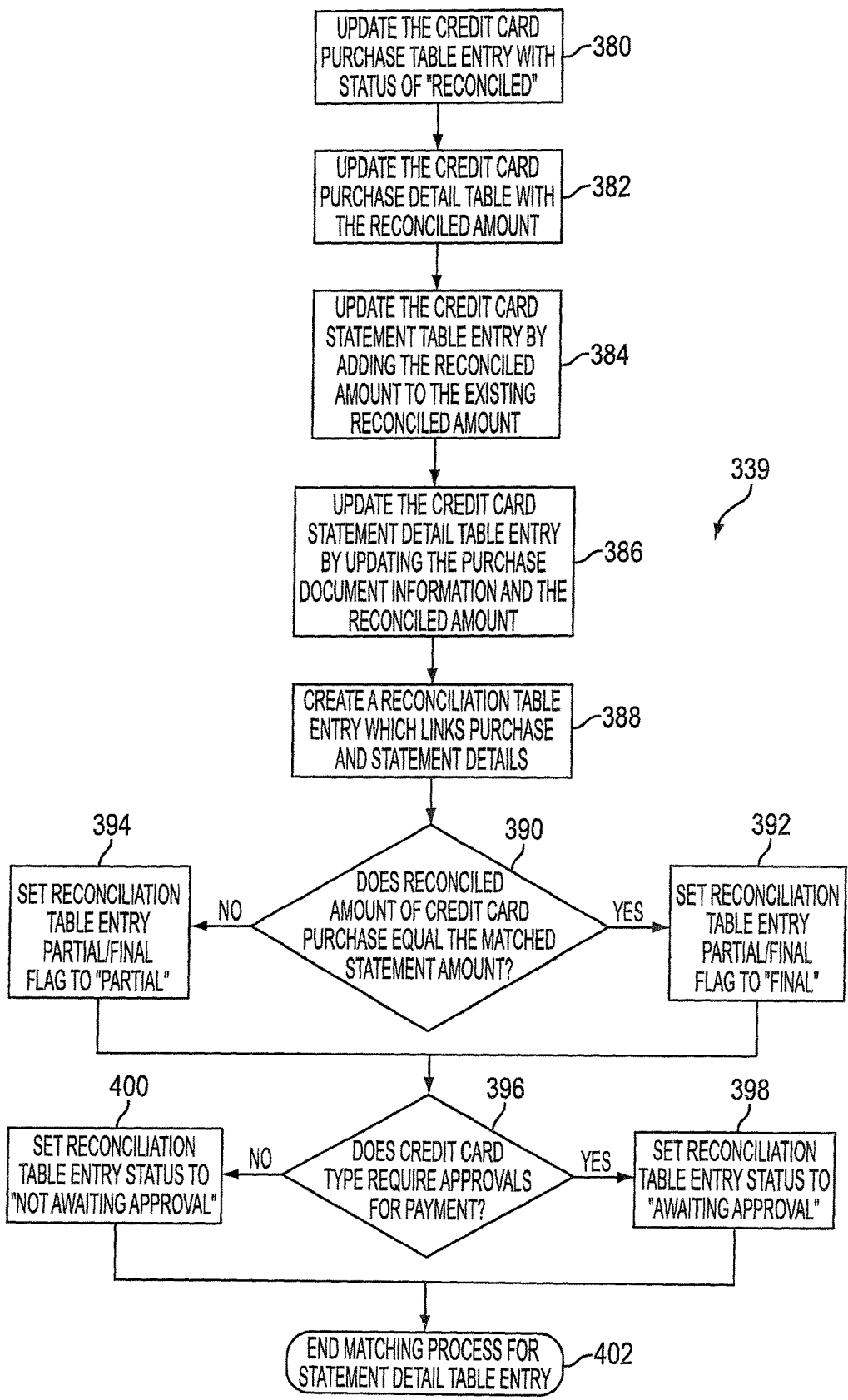

During automated reconciliation 118, as shown in FIG. 12, the system operates in another loop 320-322 where each entry in the statement table is processed until the end is reached and processing terminates 324. The first step is to access 326 the credit card type table to obtain the type for the card. Based on the type, a determination 328 is made as to whether statement or obligation reconciliation can be performed and, if not, the manual process is performed 112 (see also FIG. 3). The system then enters a loop 330-332 where the entries in the detail table are processed. In this loop, the systems attempts to find 334 a matching obligation which will be discussed in more detail using FIG. 13. If a match is not found (336), the next entry is processed. If a match is found, a determination 338 is made as to whether the purchase has been disputed. If not, reconciliation updates are performed 339, as will be described with respect to FIG. 14, and the credit card statement table is reconciled.

The matching obligation process 334 (FIG. 13) also includes a loop 340-342 where all the open billing cycles are reviewed for a matching transaction. First, a determination 344 is made as to whether the statement includes an approval code which was issued at the time of the purchase when the vendor 37 requested approval from the bank 36. If so, a search 346 of the credit card obligation table is performed using the approval code, card number and billing cycle. A determination is then made 358 as to whether a match exists. If not the table is searched 350 with the amount, card number and billing cycle. Again a determination 352 is made as to a match. If there is no match the card number and billing cycle are used for a search 354 of the purchase table. At the end of the search match loop 340-342 the system determines 356 whether a matching obligation has been found. If not, the entry is updated 358 as unreconciled and to be processed via a manual reconciliation later and processing ends 360. If a match has been found the vendor is checked 362 for a match. If there is none, an error message is issued and the entry is marked 366 reconciled with errors. The user can also approve the transaction to allow it to be paid or a dispute can be lodged or setup. When there is a vendor match, the purchase amount and purchase date are compared to the corresponding tolerances for the credit card type maintained in the credit card table. If the date or amount is outside (370) the tolerance, the system issues 372 an error message indicating that the obligation does not match and the entry is marked as reconciled with errors. If the amount is within the tolerance, the entry in the obligation is updated 374 as reconciled.

During the reconciliation update process 339 (see FIG. 14) the purchase table entry being processed is updated 380 to a status of reconciled and the purchase detail table is updated 382 with the reconciled amount. The statement table is also updated 384 by adding the amount to any previous reconciled amount accumulated, followed by doing a similar addition to the statement detail table. Next, a reconciliation table entry is created 388 linking the purchase and statement details. The credit card reconciliation table typically holds the results of all reconciliations, including both automated and user-driven reconciliation activity, such as statement number, statement line number, dispute number, purchase document number, purchase document line number, credit card number, accounting codes, reconciled amount, purchase partial/final flag, distribution method flag, payment document number, payment document line number, prepayment reversal document number, prepayment reversal document line number, status, etc. A determination 390 is then made as to whether the purchase amount equals the statement amount and, if so, the new entry in the table is set 392 to a final reconciliation status, otherwise, it is set 394 to a partial reconciled status. If the type of credit card requires (396) approval the entry is set 398 to a status requiring approval, otherwise, it is set 400 to a status where approval is not required. The update processing then ends 402.

Figure 15:
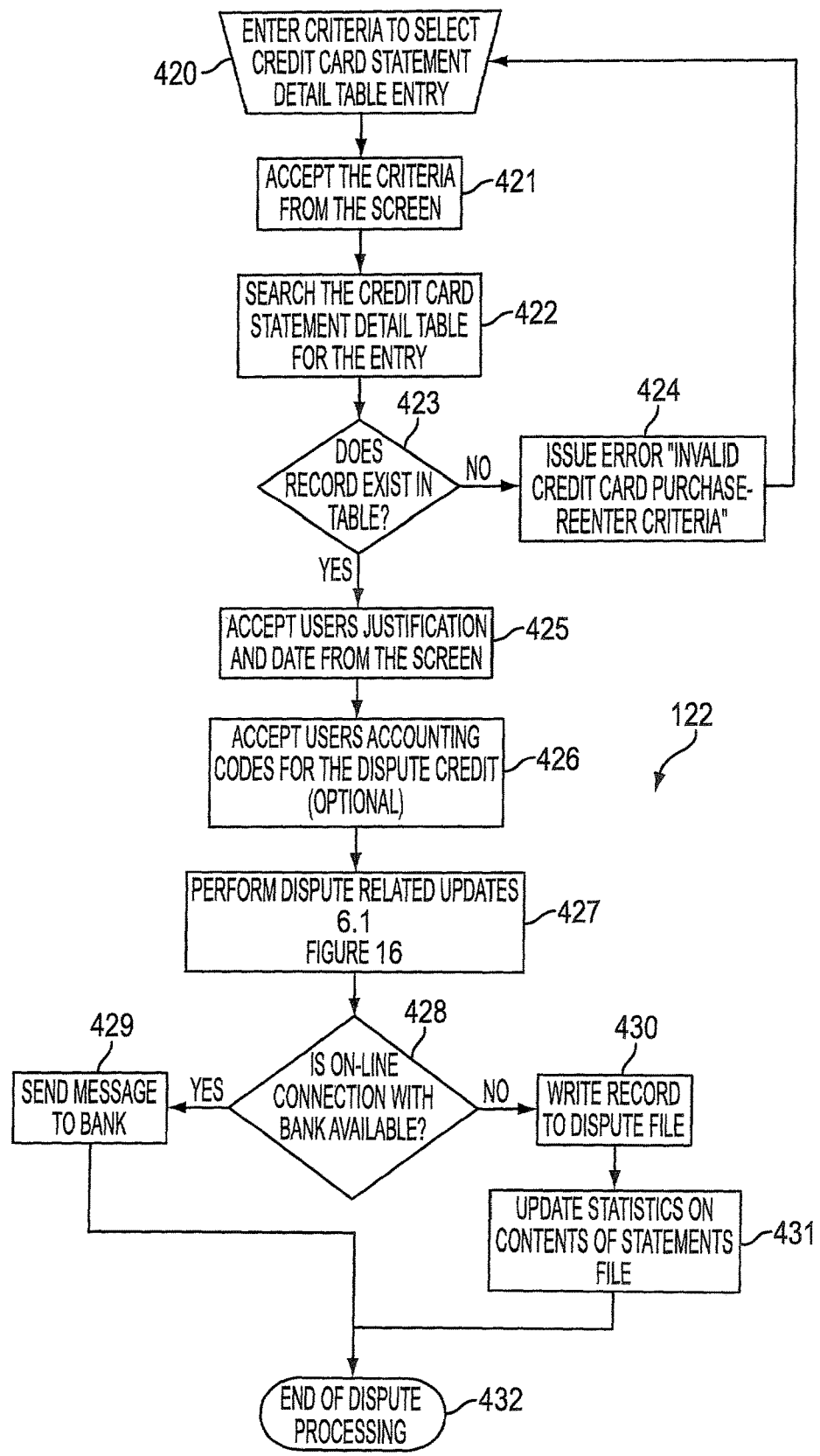
Figure 16:
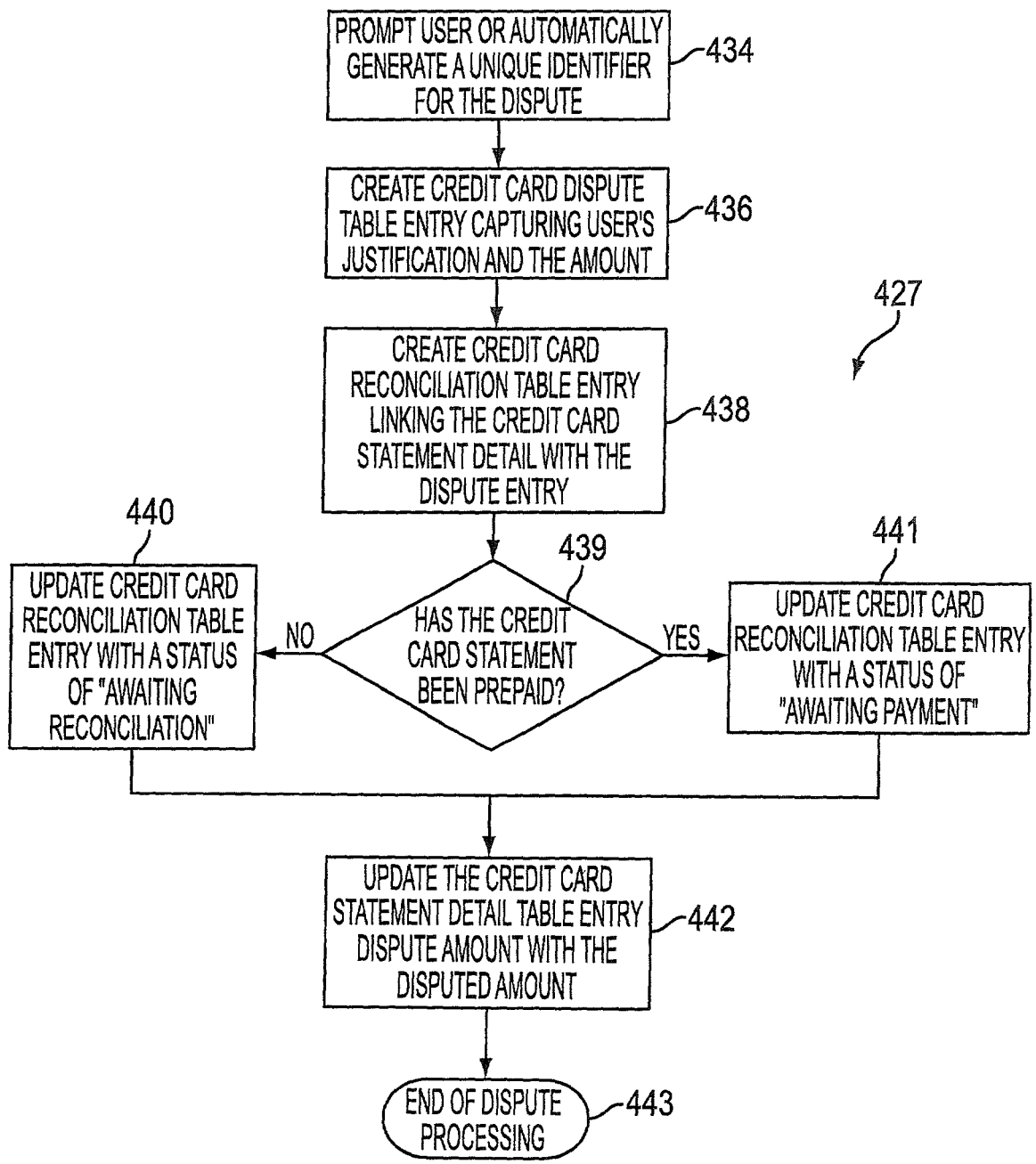

During dispute processing 122, the system allows the employee 32 to enter 420 and then accepts 421 the criteria to select items in the statement detail table for display, as illustrated in FIG. 15. This can be another entry point into the processes of the present invention. That is, the employee 32 can initiate the dispute process at any time. The criteria entered by the employee 32 could include a vendor identifier, purchase range limits and other information which will help identify a transaction. This information is used to search 422 the statement detail table. If a match is not found (423), a message is supplied 424 to the employee 32 and the employee can enter/change the search criteria. When the questioned item is found, the employee 32 can enter 425 the justification for the dispute which is used to update the statements table indicating that the item is in dispute, thereby acknowledging and tracking disputes over credit card purchases. As an option the user can accept 426 the users accounting codes for the dispute. The system then performs 427 the updates (see FIG. 16) associated with the dispute. If an on-line connection is available (428) to the bank 36, the system sends 429 a dispute message to the bank 36. Otherwise, the dispute is written 430 into a dispute file, statistics for the statement are updated 431 and dispute processing ends 432. As an extension of the above, the user may also initiate a dispute against an obligation. The dispute still needs to be matched against a statement, but this allows the end-user to record a dispute at the earliest possible time. For example, if the goods received are defective, but the credit card statement has not yet been received.

During the dispute update operation 427 (see FIG. 16), the system generates 434 a unique identifier for the dispute either with the user or automatically. A dispute table entry is then created 436 with the justification and the amount. The credit card dispute table, an optional table, holds detailed item information for each credit card transaction included in the statement received from the credit card issuing organization, such as credit card number, dispute number, dispute amount, reconciled amount, justification, dispute date, dispute accounting codes, reconciliation status, etc. Next, a linking entry in the reconciliation table to the dispute is created 438. The system then determines 439 whether the statement has been paid by looking at the payment status in the reconciliation table entry. If not, the reconciliation table is updated to indicate that the entry is awaiting reconciliation, otherwise, the entry is set 441 as awaiting payment. The statement detail table is then updated 442 and update processing of the disputes ends 443.

Figure 17:
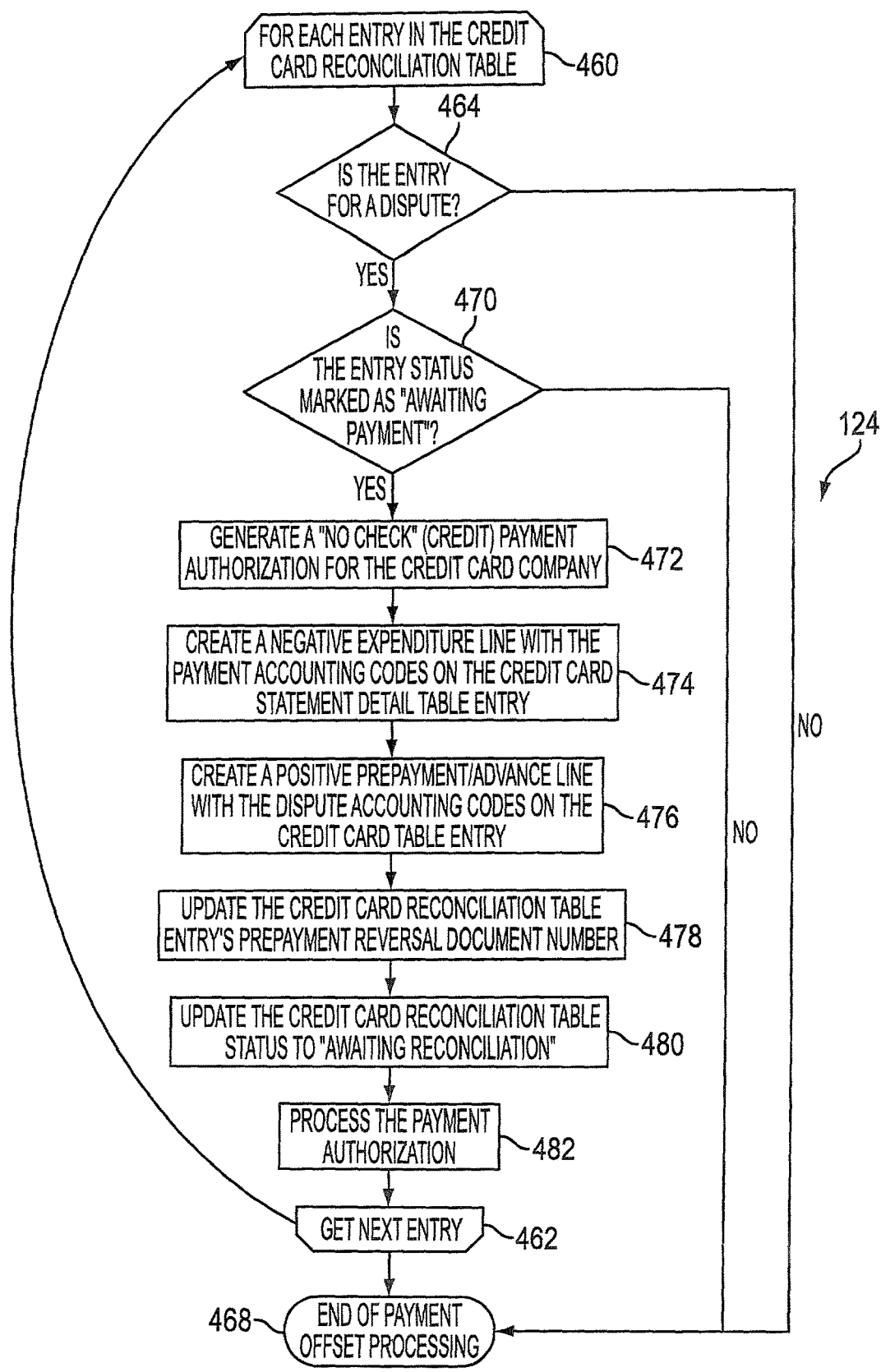

A loop 460-462 in the credit process 124 processes each entry in the credit card reconciliation table and starts, as shown in FIG. 17, with determining 464 whether the entry has been marked as disputed. If not, processing ends 468. If so, the statement is checked 470 to determine whether the entry has been marked as paid as can occur when the payments are generated immediately (see 116). In the case where the payment has been made and it is in dispute, a no-check authorization or credit is made 472 through the payment authorization for the entry to prevent the entry from being paid, followed by creating 474 a negative expenditure line or item in the credit card statement detail table for the account code which backs out the previous payment. Next, a positive prepayment or advance is created 476 for the credit card table, essentially showing an over payment to the bank or card issuer 36. Next, the reconciliation table is updated 478 with an identifier for the reversal and to indicate 480 that the entry is awaiting reconciliation. Then, the positive payment is authorization is processed 482, thereby deducting the amount from the money owed to the bank 36.

Figure 18:
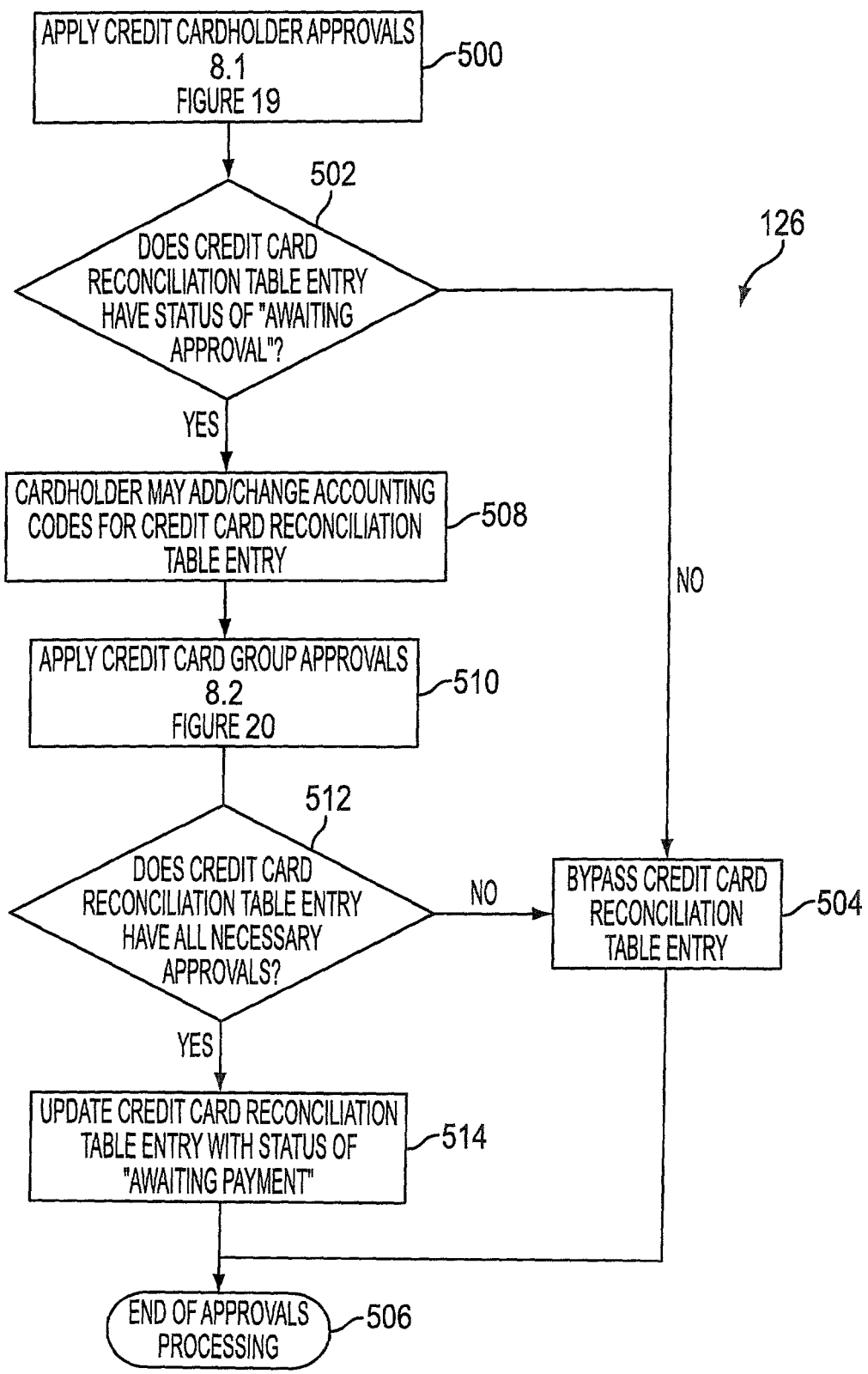

FIG. 18 illustrates the approval process 126 and starts with applying 500 the cardholder approvals which will be discussed in more detail using FIG. 19. A check is then made 502 as to whether the entry has cardholder approval and if not the entry is bypassed 504 and processing ends 506. When the entry has been approved, the employee 32 can change 508 the account codes after which the group approval process is performed 510 (see FIG. 20). Next, a determination 512 is made as to whether the reconciliation table has all the necessary approvals and, if so, the table is updated 514 as fully approved.

The cardholder approval process 500 (FIG. 19) includes an outer loop 530-532 which loops on the holders credit cards within which the credit card statement entries for each card are displayed 536 and an inner loop 538-540 which exists for processing each entry in the statement. As each entry is processed, the employee 32 is first asked 542 whether the purchase is approved. If not, the entry enters the dispute process 122 (see FIG. 15). If the purchase is approved, a check is made 544 concerning the card single purchase limit. If the limit is exceeded, a message is issued 546 and the entry is updated 548 as requiring special handling. A test of the billing cycle limit is also made 550 which, if exceeded, results in a message 560 and special handling 548. When no limits are exceeded, the entry is updated 562 as approved.

Figure 19:
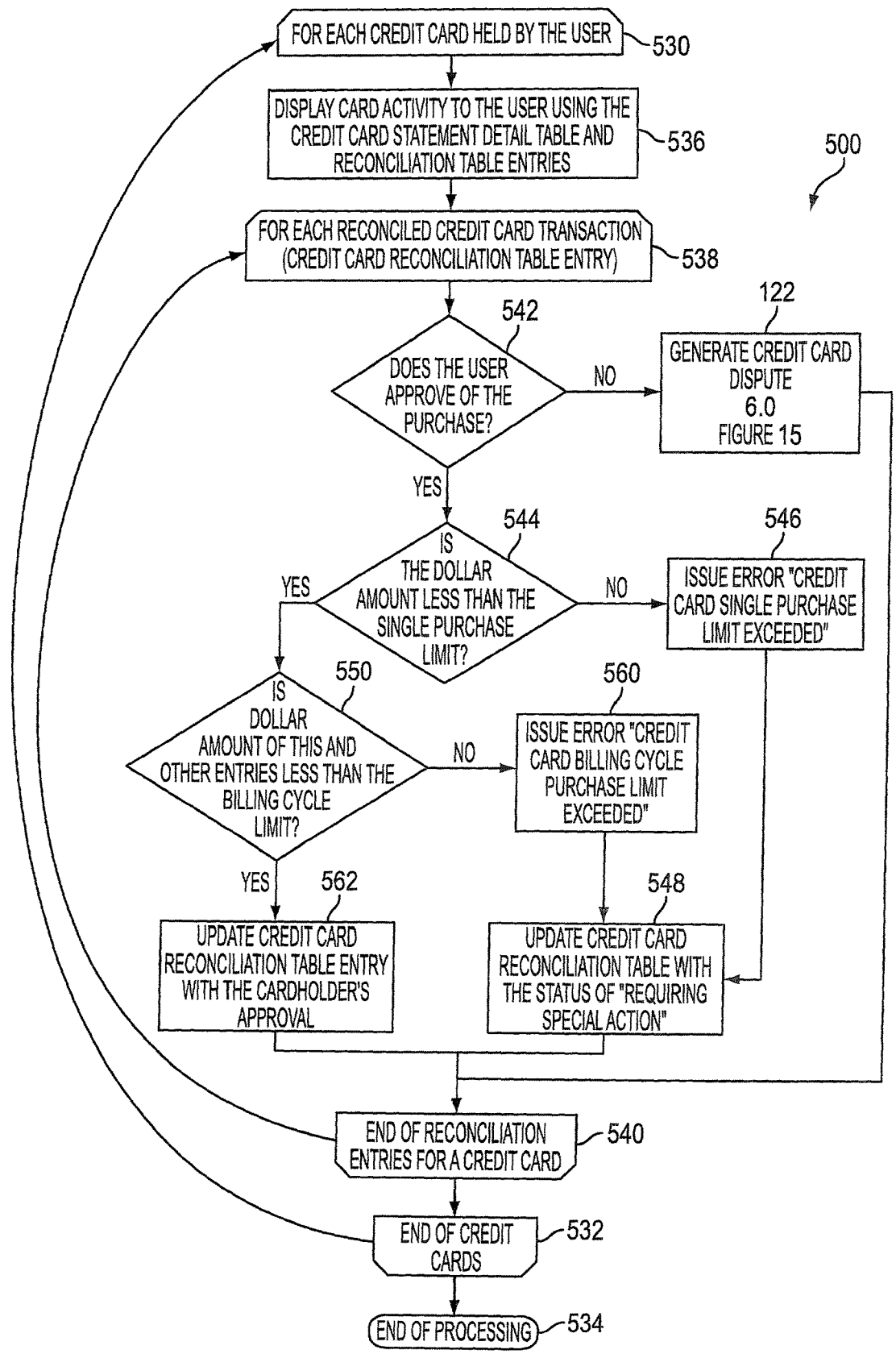
Figure 20:
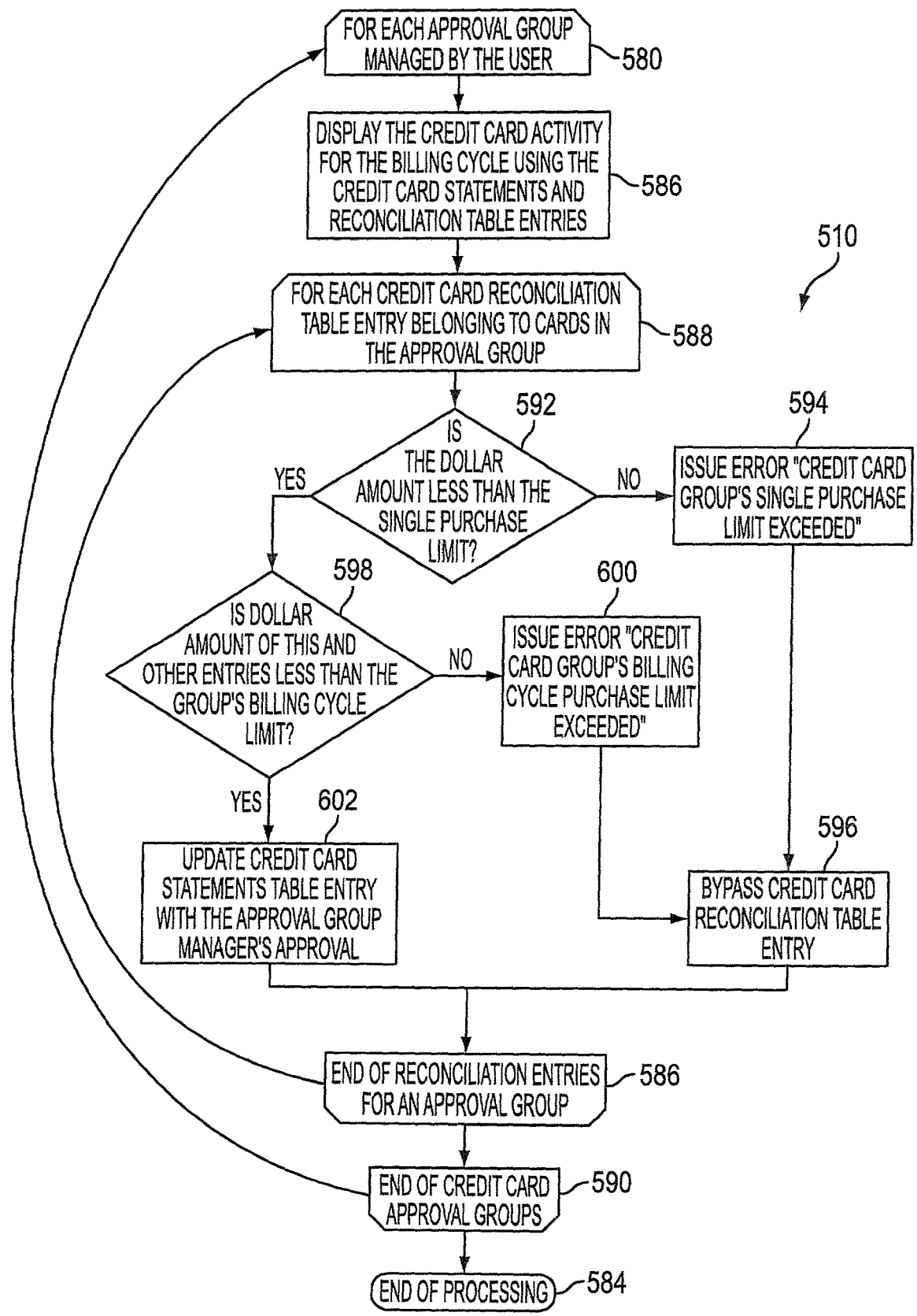
Figure 21:
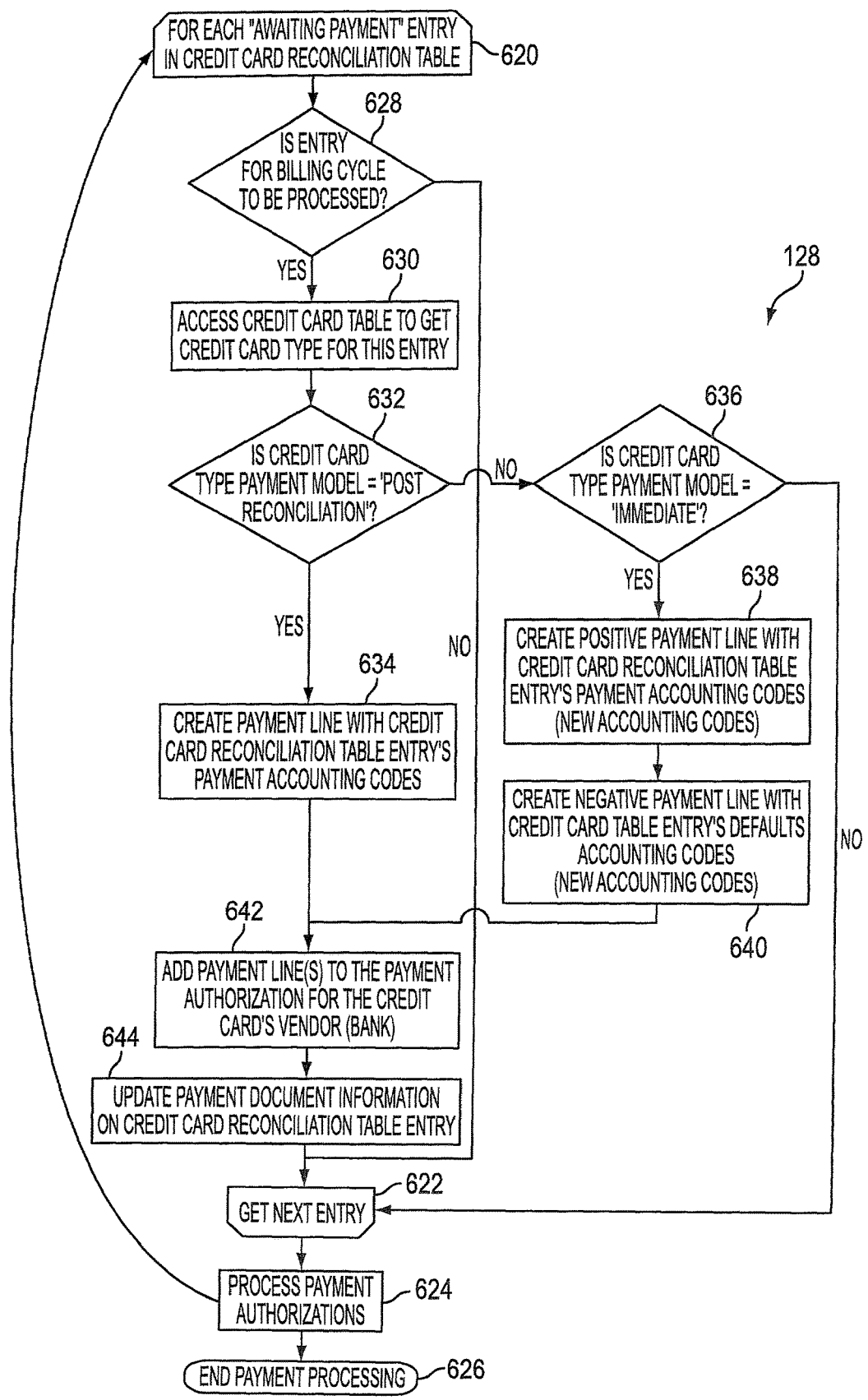

The process 510 for group approval, as depicted in FIG. 20, includes most of the same steps as the cardholder approval process of FIG. 19 but the approvals are at the group level limits and the person approving the purchase is presented all of the statement entries for all of the cards in the group. For convenience, these steps 580-602 will not be discussed in detail.

In generating credit card payments and adjusting the account codes 128 the system processes in a loop 620-622 (see FIG. 21) where approved entries in the credit card statements table are processed until all the statements have been processed, at which time the credits are processed 624 for payment authorization and processing ends 626. In the loop, each entry is examined 628 to determine whether it is in the cycle to be processed. If so, the system accesses 630 the credit card type table and obtains the credit card type using the card number. If the card is the type where post reconciliation is performed (632), the system creates 634 a payment authorization with the account codes of the table entry for the card. When the credit card is not the type for post reconciliation, the system checks 636 as to whether it is an immediate payment type. If the payment is immediate, the back-out of the immediate payment needs to be performed. To do this a payment authorization with a positive payment and the statement account codes is created 638 followed by creation 640 of a negative authorization having the default account codes. The authorizations are then added 642 to the list of authorizations for the bank 36 and the status of the entry on the reconciliation table is updated 644 as paid.

The manual or user-driven reconciliation process 112 uses a typical manual entry operation found in many financial management systems where the user is presented with a display and allowed to make entries or changes to certain items in the display. The process 112 handles four primary cases. In the first case, the organization uses purchase orders in the financial system to record credit purchases, and the bank provides electronic statements. In this case, the user is presented with a display of all unreconciled purchases in the statement detail table and allowed to view the purchases recorded on purchase orders and the transactions input from the electronic statement in parallel. The user is then able to reconcile the purchases with the transactions listed on the statement by performing matches and manually enter the reconciliation amount. In the second case, the organization uses purchase orders in the financial system to record credit card purchases, but the bank does not provide electronic statements. In this situation, the user is presented with a display of the purchases recorded on the purchase orders. The user is then able to reconcile the individual purchases with the transactions listed on the hard copy statement. For each purchase, the user can manually mark the purchase as reconciled and enter the reconciled amount. In the third case, the organization does not use purchase orders in the financial system to record credit purchases, but the bank provides electronic statements. In this case, the user is provided with the transaction information from the electronic statement (entries in the statement detail table). The user has the ability to reconcile a transaction by manually entering a reconciliation amount and/or dispute a transaction by entering a dispute amount and justification. In the last case, the organization does not use purchase orders in the financial system to record credit purchases, and the bank does not provide electronic statements. In this case, the user enters the transactions from a hard-copy statement into the financial system. If while creating the entry the user marks it as reconciled, the entry can be handled by the payment generation process. It can also be marked as in dispute and handled via the dispute process. For each user-driven reconciliation performed online, the system, as previously discussed, updates the reconciliation status on the associated statement, purchase, and/or dispute entries and creates an entry in the reconciliation table that links the statement, purchase, and/or dispute entries and allow payment processing to occur.

Figure 22:
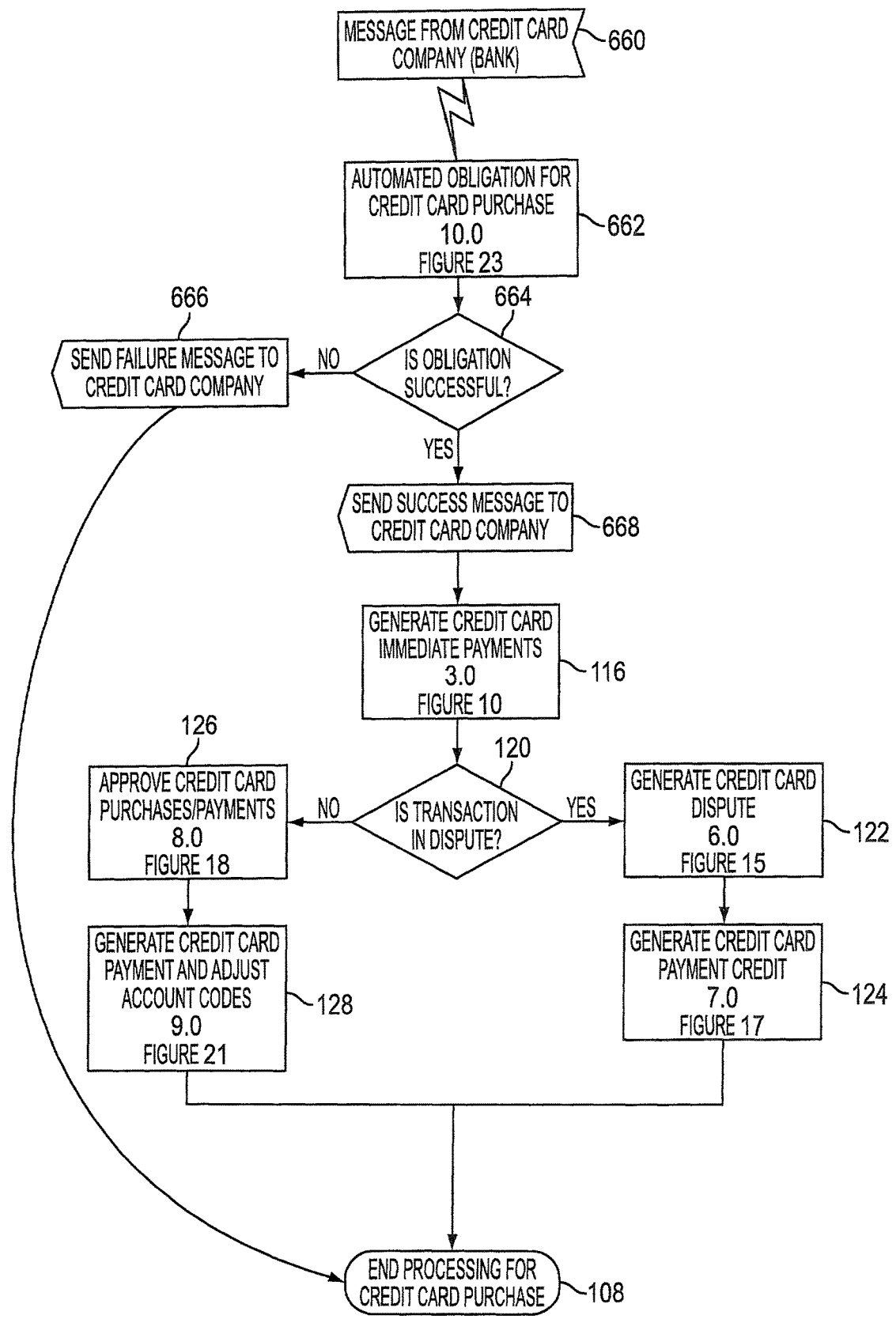
FIGS. 22 and 23 depict the flow of processing when the transaction is interactive and approved by the financial management system at the time of the purchase from a vendor.
Figure 23:
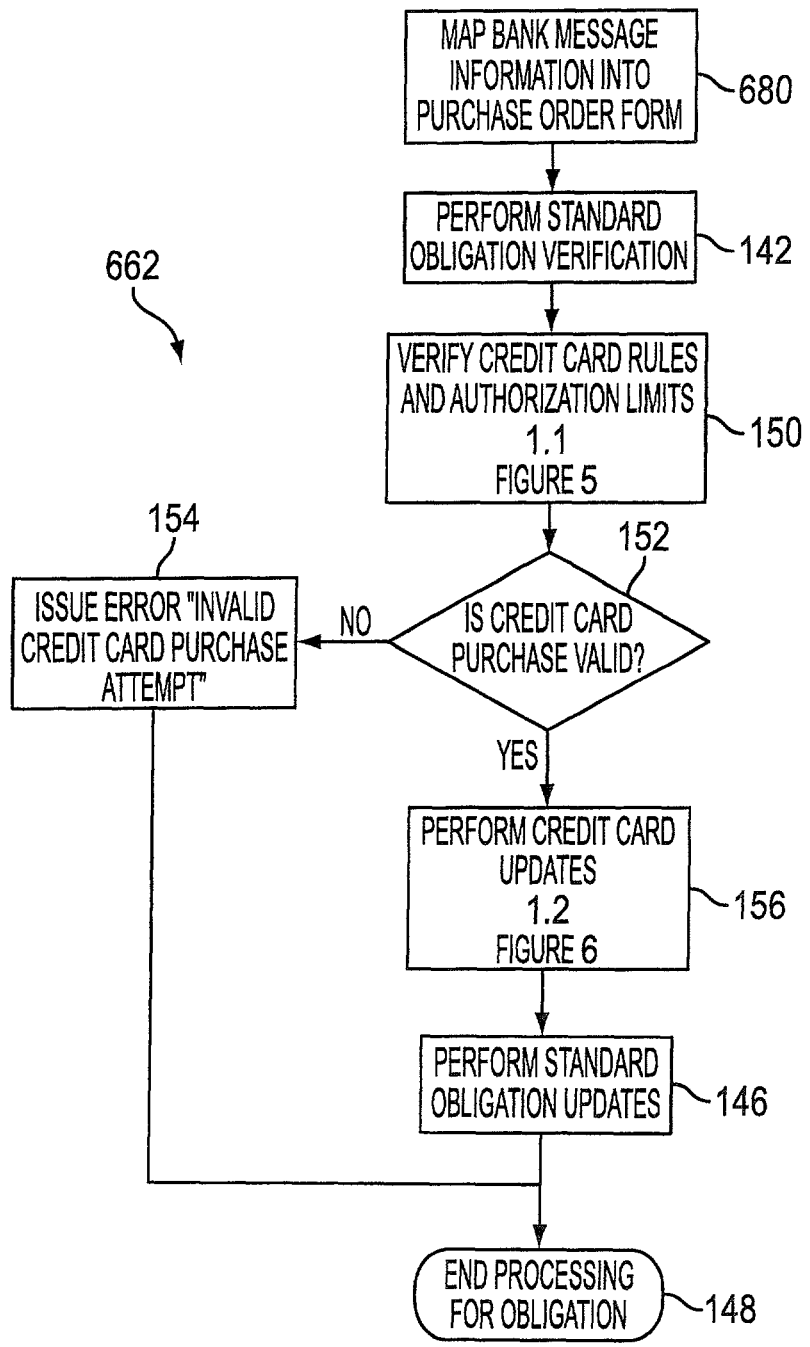

When the credit card transaction is to be approved by the financial management system interactively and in real-time at the time of the purchase from the vendor 37, the process of FIG. 3 is modified as depicted in FIG. 22. A message arrives from the bank 36 over a network, such as a packet switched network, and an automated obligation process 662, which will be discussed in more detail using FIG. 23, is performed. This step 662 is another entry point into the processes of the present invention. The message includes a transaction tag, the card number, the type of purchase, the amount, vendor name and vendor location. The system then checks 664 to determine whether the obligation was successful. If not, a failure message is sent 666 to the bank 36 which the bank can use to disapprove the transaction at the vendor 37 by sending an appropriate message to the vendor 37. For example, when the purchase amount exceeds the single purchase limit or the purchase is of a type of product, based on the product codes, that is not authorized for the default accounts for the card, a failure of approval or rejection can be generated. The message includes the transaction tag and a flag indicating the transaction has not been approved. If the obligation is successful, a success or approval message is sent to the bank 36 which can then send an approval code to the vendor 37. The date, amount and transaction tags of approved transactions are stored during the obligation process for later reconciliation. Upon success the system can generate 116 an immediate payment (see 116 FIG. 10), again allowing the company 38 to obtain most favorable credit terms or a discount. The remainder of the operations 120, 122, 124, 126, 128 and 108 have been previously discussed and will not be repeated for the sake of brevity.

In processing an automated obligation 662, the system first maps 680 the message contents into the fields of the records of the financial management system, as shown in FIG. 23. Then the operations previously discussed and associated with an obligation are performed. For brevity these operations 142, 150, 152, 154, 156, 146 and 148 will not be discussed again.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer system to electronically verify enforcement of rules to process electronic credit card purchase transactions input to the computer system, the computer system comprising:

at least one server communicatively coupled to a plurality of work stations, the at least one server including at least one processor configured to execute at least one process to, store, using financial management system control databases, information indicating a plurality of validation information to process the electronic credit card purchase transactions associated with information identifying credit cards usable to initiate the electronic credit card purchase transactions, the financial management system databases including, a single purchase limit database including internal credit card rules specifying a set of purchase limits, account limits, and budget limits, the credit card rules settable by at least one authorized first user in a first group of users;

an internal financial system credit limit database including a set of internal credit limits on a credit card among the credit cards and a second user basis, including a transaction credit limit, amount and date tolerances associated with the transaction credit limit, a billing cycle limit, and authorized budget account codes, the set of internal credit limits settable by the at least one first user in the first group of users prior to occurrence of an electronic credit card purchase transaction, independent of an external monetary limit set by an external card system to control the external monetary limit of the credit card;

a security control database including security and approval control information and information identifying the second user in a second group of users other than the first group of users to authorize the second user to request electronic obligation processing of an individual electronic credit card purchase transaction for an individual credit card and to apply an approval to the individual electronic credit card purchase transaction;

create an obligation transaction database to link information indicating an electronic approval of the electronic obligation processing request by the second user for the individual credit card purchase transaction to the internal credit card rules in the single purchase limit database, and the set of internal credit limits in the internal financial system credit limit database, in response to the system electronically receiving through a first workstation among the workstations an obligation processing request including,
an alias configured for the individual credit card and an anticipated electronic credit card purchase transaction, an anticipated credit card purchase amount and an anticipated credit card purchase transaction purpose, prior to the occurrence of the individual electronic credit card purchase transaction,
the electronic approval of the obligation processing request subjected to a plurality of controls in the financial management system control databases in order of,
a first electronic verification to verify security authorization of the second user according to the security control information in the security control database, and
a plurality of second verifications of the internal credit card rules and the internal credit limits to,
electronically first verify the anticipated credit card purchase transaction purpose corresponds to the authorized budget account codes for the second user and the individual credit card in the internal credit limits and is within a purchase limit, an account limit and a budget limit of an internal credit card rule for the individual credit card in the single purchase limit database,
electronically second verify the anticipated credit card purchase amount is within the billing cycle limit for second user and the individual credit card in the in the internal credit limits,
electronically third verify the anticipated credit card purchase amount is within the amount and date tolerances, in the internal credit limits, and
electronically fourth verify the anticipated credit card purchase amount is within the budget limit of the internal credit card rule of at least one authorized first user in the single purchase limit database, and
in response to the electronic approval of the obligation processing according to the ordered first and plurality of second electronic verifications, link the electronic approval of the obligation processing request to the internal credit card rules and the internal credit limits in the single purchase limit and the internal financial system credit limit databases by electronically allocating an obligation identifier and inserting the obligation identifier and the configured alias to be associated with the approved obligation processing request of the second user for the individual credit card; and
in response to receipt of actual electronic credit card purchase transaction information,
store, in a credit card purchase transaction database, information indicating an actual credit card purchase amount, an actual credit card purchase transaction purpose, and ledger account information associated with the actual credit card purchase transaction, from the external card system, and
identify the approved obligation processing request corresponding to the credit card purchase transaction information in the credit card transaction database according to the obligation identifier and the configured alias in the obligation transaction database to,
perform an electronic third verification by,
electronically verifying the actual credit card purchase amount is within the anticipated credit card purchase amount including the associated amount and date tolerances in the internal credit limits database,
electronically verifying the actual credit card purchase transaction purpose matches the anticipated obligation transaction purpose,
electronically verifying security information of the user matches the security authorization of the second user in the security controls database, and
electronically track the obligation processing request in the computer system across the single purchase limit, internal credit limits, security control and obligation transaction databases, to output information indicative of a reconciliation of the actual credit card purchase transaction with the obligation transaction to indicate, through the reconciliation, a validation of the actual credit card purchase transaction with the single purchase limit and internal credit limits, and to cause electronic enforcement of the single purchase limit and the internal credit limits in the internal financial system credit limit database for the actual credit card purchase transaction by the computer system independent of the external card system.

2. A non-transitory computer readable medium storing a program that, when executed by at least one computer in a computer system, cause the at least one computer to execute at least one process to electronically verify enforcement of rules to process electronic credit card purchase transactions input to the computer system, the at least one process comprising:
storing, using financial management system control databases, information indicating a plurality of validation information to process the electronic credit card purchase transactions associated with information identifying credit cards usable to initiate the electronic credit card purchase transactions, the financial management system databases including,
a single purchase limit database including internal credit card rules specifying a set of purchase limits, account limits, and budget limits, the credit card rules settable by at least one authorized first user in a first group of users;
an internal financial system credit limit database including a set of internal credit limits on a credit card among the credit cards and a second user basis, including a transaction credit limit, amount and date tolerances associated with the transaction credit limit, a billing cycle limit, and authorized budget account codes,
the set of internal credit limits settable by the at least one first user in the first group of users prior to occurrence of an electronic credit card purchase transaction, independent of an external monetary limit set by an external card system to control the external monetary limit of the credit card;
a security control database including security and approval control information and information identifying the second user in a second group of users other than the first group of users to authorize the second user to request electronic obligation processing of an individual electronic credit card purchase transaction for an individual credit card and to apply an approval to the individual electronic credit card purchase transaction;

creating an obligation transaction database to link information indicating an electronic approval of the electronic obligation processing request by the second user for the individual credit card purchase transaction to the internal credit card rules in the single purchase limit database, and the set of internal credit limits in the internal financial system credit limit database, in response to the computer electronically receiving an obligation processing request including, an alias configured for the individual credit card and an anticipated electronic credit card purchase transaction, an anticipated credit card purchase amount and an anticipated credit card purchase transaction purpose, prior to the occurrence of the individual electronic credit card purchase transaction, the electronic approval of the obligation processing request subjected to a plurality of controls in the financial management system control databases in order of, a first electronic verification to verify security authorization of the second user according to the security control information in the security control database, and a plurality of second verifications of the internal credit card rules and the internal credit limits to, electronically first verify the anticipated credit card purchase transaction purpose corresponds to the authorized budget account codes for the second user and the individual credit card in the internal credit limits and is within a purchase limit, an account limit and a budget limit of an internal credit card rule for the individual credit card in the single purchase limit database, electronically second verify the anticipated credit card purchase amount is within the billing cycle limit for second user and the individual credit card in the in the internal credit limits, electronically third verify the anticipated credit card purchase amount is within the amount and date tolerances, in the internal credit limits, and electronically fourth verify the anticipated credit card purchase amount is within the budget limit of the internal credit card rule of at least one authorized first user in the single purchase limit database, and in response to the electronic approval of the obligation processing according to the ordered first and plurality of second electronic verifications, linking the electronic approval of the obligation processing request to the internal credit card rules and the internal credit limits in the single purchase limit and the internal financial system credit limit databases by electronically allocating an obligation identifier and inserting the obligation identifier and the configured alias to be associated with the approved obligation processing request of the second user for the individual credit card; and in response to receipt of actual electronic credit card purchase transaction information, storing, in a credit card purchase transaction database, information indicating an actual credit card purchase amount, an actual credit card purchase transaction purpose, and ledger account information associated with the actual credit card purchase transaction, from the external card system, and identifying the approved obligation processing request corresponding to the credit card purchase transaction information in the credit card transaction database according to the obligation identifier and the configured alias in the obligation transaction database to, perform an electronic third verification and tracking by, electronically verifying the actual credit card purchase amount is within the anticipated credit card purchase amount including the associated amount and date tolerances in the internal credit limits database, electronically verifying the actual credit card purchase transaction purpose matches the anticipated obligation transaction purpose, electronically verifying security information of the user matches the security authorization of the second user in the security controls database, and electronically track the obligation processing request in the computer system across the single purchase limit, internal credit limits, security control and obligation transaction databases, to output information indicative of a reconciliation of the actual credit card purchase transaction with the obligation transaction to indicate, through the reconciliation, a validation of the actual credit card purchase transaction with the single purchase limit and internal credit limits, and to cause electronic enforcement of the single purchase limit and the internal credit limits in the internal financial system credit limit database for the actual credit card purchase transaction by the computer system independent of the external card system.

* * * * *

UNITED STATES PATENT AND TRADEMARK OFFICE
CERTIFICATE OF CORRECTION

PATENT NO. : 10,713,712 B2  
APPLICATION NO. : 09/922106  
DATED : July 14, 2020  
INVENTOR(S) : Richard Bissonette et al.

Page 1 of 1

It is certified that error appears in the above-identified patent and that said Letters Patent is hereby corrected as shown below:

In the Claims

Column 17, Line 32:  
In Claim 1, delete "in the in the" and insert -- in the --, therefor.

Column 19, Line 40:  
In Claim 2, delete "in the in the" and insert -- in the --, therefor.

Signed and Sealed this  
Eighth Day of September, 2020

Andrei Iancu  
*Director of the United States Patent and Trademark Office*